United States Patent
Lunneborg

(10) Patent No.: US 7,339,144 B2
(45) Date of Patent: Mar. 4, 2008

(54) MAGNETIC HEAT GENERATION

(75) Inventor: Timothy W. Lunneborg, Wahpeton, ND (US)

(73) Assignee: MagTec LLC, Fargo, ND (US)

( * ) Notice: Subject to any disclaimer, the term of this patent is extended or adjusted under 35 U.S.C. 154(b) by 0 days.

(21) Appl. No.: 11/174,316

(22) Filed: Jun. 30, 2005

(65) Prior Publication Data

US 2005/0263522 A1  Dec. 1, 2005

Related U.S. Application Data

(63) Continuation-in-part of application No. 10/821,295, filed on Apr. 9, 2004, now abandoned.

(51) Int. Cl.
*H05B 6/38* (2006.01)
(52) U.S. Cl. ...................... 219/631; 219/628
(58) Field of Classification Search ............ 219/631, 219/600, 630, 629, 628, 618; *A05B 6/10*
See application file for complete search history.

(56) References Cited

U.S. PATENT DOCUMENTS

| | | |
|---|---|---|
| 2,566,274 A | 8/1951 | White et al. |
| 3,014,116 A | 12/1961 | MacArthur |
| 3,534,197 A | 10/1970 | Burnett |
| 4,145,591 A | 3/1979 | Takeda |
| 4,421,967 A | 12/1983 | Birgel et al. |
| 4,471,191 A | 9/1984 | Greis et al. |
| 4,486,638 A | 12/1984 | de Bennetot |
| 4,503,305 A | 3/1985 | Virgin |
| 4,600,821 A | 7/1986 | Fichtner et al. |
| 4,614,853 A | 9/1986 | Gerard et al. |
| 4,635,705 A | 1/1987 | Kuznetsov |
| 5,012,060 A * | 4/1991 | Gerard et al. ............... 219/631 |
| 5,237,144 A | 8/1993 | Iguchi |
| 5,263,920 A * | 11/1993 | Budza et al. .................. 492/8 |

(Continued)

FOREIGN PATENT DOCUMENTS

GB    2119609 A    11/1983

(Continued)

OTHER PUBLICATIONS

U.S. Appl. No. 10/269,690, filed Oct. 2002, Reed et al.

(Continued)

*Primary Examiner*—Daniel Robinson
(74) *Attorney, Agent, or Firm*—Berkeley Law & Technology Group, LLP; Paul J. Fordenbacher, Esq.

(57) ABSTRACT

A magnetic heater is provided having a conductor assembly and a magnet assembly. The magnet assembly is adapted to rotate relative to the conductor assembly about an axis so as to induce eddy currents in the conductor assembly when relative motion is produced between the conductor assembly and first magnet assembly. The conductor assembly defines a fluid path therein for the transfer of heat from the conductor assembly to a fluid. The magnetic heater is a component of a heat generation system comprising an internal combustion engine having a drive shaft for rotating the magnet assembly. The heat generated by the magnetic heater, as well as the heat generated by the engine from the engine exhaust and engine cooling system, is combined to heat a fluid.

21 Claims, 22 Drawing Sheets

U.S. PATENT DOCUMENTS

| | | | |
|---|---|---|---|
| 5,286,942 | A | 2/1994 | McFadden et al. |
| 5,773,798 | A | 6/1998 | Fukumura |
| 5,870,660 | A * | 2/1999 | Ito et al. ............... 399/330 |
| 5,914,065 | A | 6/1999 | Alavi |
| 5,994,681 | A | 11/1999 | Lloyd |
| 6,011,245 | A | 1/2000 | Bell |
| 6,144,020 | A * | 11/2000 | Usui et al. .............. 219/631 |
| 6,147,336 | A | 11/2000 | Ushijima et al. |
| 6,297,484 | B1 | 10/2001 | Usui et al. |
| 6,489,598 | B1 * | 12/2002 | Hielm ................... 219/631 |
| 6,717,118 | B2 * | 4/2004 | Pilavdzic et al. ........ 219/601 |
| 6,969,833 | B2 * | 11/2005 | Suzuki .................. 219/619 |
| 7,009,158 | B2 * | 3/2006 | Sekiguchi et al. ....... 219/619 |
| 2003/0066830 | A1 | 4/2003 | Reed et al. |
| 2005/0006381 | A1 | 1/2005 | Lunneborg |

FOREIGN PATENT DOCUMENTS

| | | |
|---|---|---|
| TW | 399829 | 7/2000 |
| WO | PCT/US02/23569 | 7/2002 |

OTHER PUBLICATIONS

U.S. Appl. No. 60/307,409, filed Jul. 2001, Reed et al.
Office action mailed Jun. 22, 2005, for related U.S. Appl. No. 10/821,295.
Amendment filed Sep. 12, 2005, for related U.S. Appl. No. 10/821,295.
Notice of Non-complaint Amendment, mailed Oct. 25, 2005, for related U.S. Appl. No. 10/821,295.
Amendment and Response to Non-Compliant Notice, filed Nov. 1, 2005, for related U.S. Appl. No. 10/821,295.
Restriction Requirement mailed Jan. 26, 2006, for related U.S. Appl. No. 10/821,295.
Response to Restriction Requirement filed Sep. 25, 2006, for related U.S. Appl. No. 10/821,295.
Non-Final Reject mailed Jul. 24, 2007, for related U.S. Appl. No. 10/821,295.
Response filed Oct. 24, 2007 to Office action mailed Jul. 24, 2007, for related U.S. Appl. No. 10/821,295.
Restriction Requirement mailed Nov. 17, 2006, for related application. 11/243,394.
Response to Restriction Requirement filed Dec. 18, 2006, for related U.S. Appl. No. 11/243,394.
International preliminary Examination Report for related application PCT/US02/23569, mailed Nov. 20, 2003.
Written Opinion for related application PCT/US02/23569, mailed Apr. 9, 2003.
Response to Written Opinion for related applicaton PCT/US02/23569, filed Jul. 23, 2003.

* cited by examiner

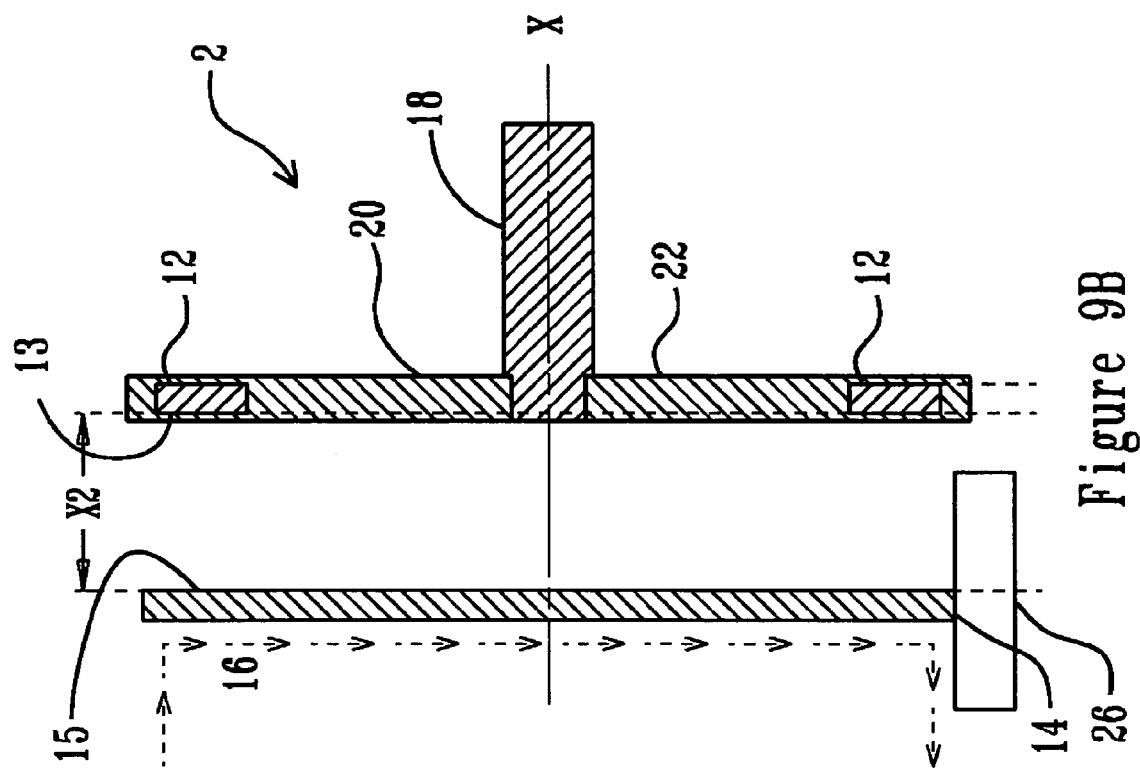
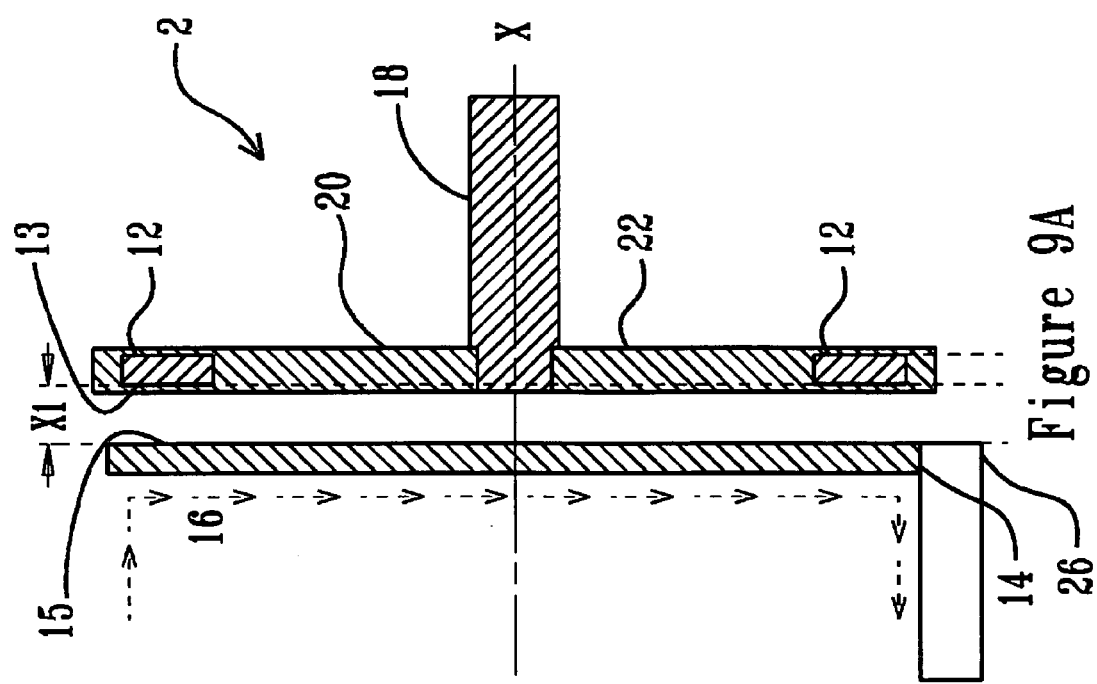

MAGNETIC HEAT GENERATION

RELATED APPLICATIONS

This is a continuation-in-part application claiming benefit under 35 USC § 120 of U.S. Utility application Ser. No. 10/821,295, filed Apr. 9, 2004 now abandoned and entitled CONTROLLED MAGNETIC HEAT GENERATION, claiming benefit to U.S. Utility application Ser. No. 10/269,690, filed Oct. 11, 2002 and entitled MAGNETIC HEATER APPARATUS AND METHOD, which is in its entirety incorporated herewith by reference; claiming priority to Continuation application No. PCT/US02/23569, filed on Jul. 23, 2002, which is in its entirety incorporated herewith by reference; claiming priority to Provisional application No. 60/307,409, filed on Jul. 24, 2001, which is in its entirety incorporated herewith by reference.

FIELD OF THE INVENTION

The present invention is related to devices for the production of heat, and more particularly, to methods and apparatus for generating heat using magnetic induction.

BACKGROUND

A magnetic heater generates heat by a phenomenon known as magnetic inductive heating. Magnetic inductive heating occurs in an electrically conductive member when exposed to a time-varying magnetic field. The varying magnetic field induces eddy currents within the conductive member, thereby heating it. An increase in the magnitude of the variations of the magnetic field increases the rate at which the conductive member is heated. The heated conductive member can then be used as a heat source for various purposes. The heated conductive member is often used to heat a fluid, such as air or water, which is circulated past the conductive member. The heated fluid is then used to transfer the heat from the heater for external use.

One method of exposing a conductive member to a varying magnetic field is to move a magnetic field source relative to the conductive member. This motion may be achieved by arranging magnets around the edge of a circular disk having a rotatable shaft substantially at its center, the flat surface of the disk being opposable to an essentially flat portion of the surface of the conductive member. As the shaft of the disk is rotated, the magnets move relative to the surface of the conductive member. A given point on the conductive member is exposed to a cyclically varying magnetic field as each of the magnets approach, pass over, and retreat from that given point.

The amount of heat induced within the conductive member depends on many factors, some of which include the strength of the magnetic field, the distance between the magnets and the conductive member (referred herein as the "conductor/magnet spacing"), and the relative speed of the magnets to the conductive member.

Conventional magnetic heaters suffer from several disadvantages. For example, many conventional magnetic heaters have limited precision in their control of operational parameters such as the rate of heat generation, the efficiency of heat generation, and the efficiency of heat transfer to the working fluid used to carry the heat.

A magnetic heater is needed that provides one or more of the following: improved control of the rate of heat generation, improved efficiency of heat generation, and improved efficiency of heat transfer to the working fluid used to carry the heat.

SUMMARY

In an embodiment in accordance with the present invention, a magnetic heater comprises a drive shaft, one or more conductor assemblies, and one or more magnet assemblies comprising one or more magnets. Each conductor assembly comprises a pair of conductor plates defining a fluid space there between. The fluid space is in fluid communication with a fluid inlet and a fluid outlet adapted to allow the flow of fluid through the fluid space. At least one of the conductor plates comprises an electrically conductive material adapted to enable induced eddy-currents within the at least one conductor plate when exposed to a time-varying magnetic flux. Each magnet assembly is in opposing, facing arrangement spaced apart a predetermined distance from a respective conductor assembly, aligned along an axis about the drive shaft. The magnet assembly is adapted to dispose the one or more magnets in close proximity to the conductor assembly. Each magnet assembly is coupled to the drive shaft adapted such that the magnet assembly rotates relative to the conductor assembly when the drive shaft is caused to rotate. The magnet assembly is adapted to induce eddy currents in the conductor assembly when moved relative thereto. The fluid passage is adapted to provide heat transfer from the conductor plates to the fluid as the conductor plates are heated during operation.

In another embodiment in accordance with the present invention, the magnetic heater further comprises wherein adjacent magnets have opposite polarity.

In another embodiment in accordance with the present invention, the magnetic heater further comprises a first and second conductor assembly coaxially disposed in alternating arrangement with a first, second, and third magnet assembly.

In another embodiment in accordance with the present invention, the magnetic heater further comprises a magnet plate in the form of a substantially circular disk. A plurality of magnet pockets disposed on a side of the magnet plate and at a predetermined distance adjacent a magnet plate peripheral edge, the plurality of magnet pockets adapted to at least partially receive at least one magnet therein, at least one magnet at least partially disposed within each magnet pocket, and at least one retainer plate coupled to the magnet plate coupling the magnet within the magnet pocket.

In another embodiment in accordance with the present invention, the magnetic heater wherein the retainer plates comprise a plurality of fastener apertures adapted to receive suitable fasteners there through, the fastener apertures adapted to align with threaded bores disposed in the magnet plate.

In another embodiment in accordance with the present invention, the magnetic heater wherein the retainer plate comprises a plurality of retainer pockets complementary with the magnet pockets and adapted to receive at least a portion of at least one magnet therein.

In another embodiment in accordance with the present invention, the magnetic heater wherein the magnet pockets are adapted to receive the magnet entirely therein, and the retainer plate comprises a substantially flat surface to contain the magnet there in.

In another embodiment in accordance with the present invention, the magnetic heater wherein the magnet assembly comprises a magnet plate in the form of a substantially circular disk, and at least one retainer plate coupled to the magnet plate, the at least one retainer plate including one or more magnet pockets disposed on a side of the retainer plate, the retainer pocket adapted to receive the magnet therein, at least one magnet disposed within each magnet pocket.

In another embodiment in accordance with the present invention, the magnetic heater wherein the magnet plates further comprise a central shaft aperture adapted to accept the drive shaft there through.

In another embodiment in accordance with the present invention, the magnetic heater wherein the pair of conductor plates are retained about a peripheral edge in fluid-tight engagement. The conductor plates each have a bushing aperture adapted to receive the bushing therein. A bushing seal about the bushing aperture is adapted to engage the conductor plates in fluid-tight engagement there between to retain fluid within the fluid space.

In another embodiment in accordance with the present invention, the magnetic heater wherein the pair of conductor plates retained about a peripheral edge in fluid-tight engagement by a frame. The frame is adapted to retain the conductor plates in facing spaced-apart relationship a predetermined distance apart defining a fluid space there between. The frame is adapted to seal the peripheral edge of the conductive plates such that fluid is retained within the fluid space, the conductor plates each have a bushing aperture adapted to receive the bushing therein, a bushing seal about the bushing aperture adapted to engage the conductor plates about the bushing aperture and the bushing is adapted to maintain fluid-tight engagement there between to retain fluid within the fluid space.

In an embodiment in accordance with the present invention, an engine-driven heat generation system comprises an internal combustion engine having a drive shaft, a magnetic heater, and a fluid handling system. The magnetic heater comprises at least one conductor assembly and at least one magnet assembly in closely-spaced, opposing, alternating configuration with the conductor assemblies, aligned along an axis about the drive shaft. Each magnet assembly is coupled to the drive shaft adapted such that the magnet assembly rotates relative to the conductor assemblies when the drive shaft is rotated. The magnet assembly is adapted to induce eddy currents in the conductor assembly when moved relative thereto. The fluid handling system comprises a fluid reservoir, a manifold flow control adapted to direct fluid to the fluid path of the magnetic heater, an exhaust heat exchanger, and a coolant heat exchanger. The heat from the exhaust of the engine is transferred to the fluid in the exhaust heat exchanger. The heat from an engine cooling system, which comprises a coolant reservoir, is transferred to the fluid in the coolant heat exchanger. The heat generated by the magnetic heater is transferred to the fluid passing within the magnetic heater. The fluid is recollected in the fluid reservoir and either directed again through the manifold flow control or directed to an external heat exchanger by way of an external manifold. The external manifold is adapted to provide fluid take-offs to supply heated fluid and return cooled fluid to/from the external heat exchanger. The drive shaft of the engine adapted to rotate the magnet assemblies within the magnetic heater which in turn heats the conductor plates and a working fluid flowing within the fluid path of the conductor assemblies, the fluid handling system.

In another embodiment in accordance with the present invention, an engine-driven heat generation system wherein the magnet assembly comprises a plurality of magnets. The magnet assembly is adapted to dispose the magnets in close proximity to the conductor assembly.

In another embodiment in accordance with the present invention, an engine-driven heat generation system wherein the magnetic heater comprises a first, second and third conductor assembly in alternating arrangement with a first, second, third, and fourth magnet assembly. The conductor assemblies and magnet assemblies being disposed upon the shaft. The conductor assemblies and magnet assemblies are spaced apart a predetermined distance.

In another embodiment in accordance with the present invention, an engine-driven heat generation system wherein the magnet assembly comprises a magnet plate in the form of a substantially circular disk, a plurality of magnet pockets disposed on a side of the magnet plate and at a predetermined distance adjacent a magnet plate peripheral edge, the plurality of magnet pockets adapted to at least partially receive at least one magnet therein. At least one magnet at least partially disposed within each magnet pocket. At least one retainer plate coupled to the magnet plate capturing the magnet within the magnet pocket.

In another embodiment in accordance with the present invention, an engine-driven heat generation system wherein the retainer plates comprise a plurality of fastener apertures adapted to receive suitable fasteners there through, the fastener apertures adapted to align with threaded bores disposed in the magnet plate.

In another embodiment in accordance with the present invention, an engine-driven heat generation system wherein the retainer plate comprises a plurality of retainer pockets complementary with the magnet pockets and adapted to receive at least a portion of at least one magnet therein.

In another embodiment in accordance with the present invention, an engine-driven heat generation system wherein the magnet pockets are adapted to receive the magnet entirely therein, and the retainer plate comprises a substantially flat surface to contain the magnet there in.

In another embodiment in accordance with the present invention, an engine-driven heat generation system wherein the retainer pockets are adapted to receive the magnet entirely therein, and the magnet plate comprises a substantially flat surface to contain the magnet there in.

In another embodiment in accordance with the present invention, an engine-driven heat generation system wherein the magnet plates further comprise a central shaft aperture adapted to accept the shaft there through.

In another embodiment in accordance with the present invention, an engine-driven heat generation system wherein the conductor assembly comprises a pair of conductor plates retained about a peripheral edge in fluid-tight engagement by a frame.

The conductor plates comprise an electrically conductive material adapted to enable induced eddy-currents within the conductor plate when exposed to a time-varying magnetic flux. The frame is adapted to retain the conductor plates in facing spaced-apart relationship a predetermined distance apart defining a fluid space there between. The frame is adapted to seal the peripheral edge of the conductive plates such that fluid is retained within the fluid space. The conductor plates each have a bushing aperture adapted to receive the bushing therein. A bushing seal about the bushing aperture is adapted to engage the conductor plates about the bushing aperture and the bushing is adapted to maintain fluid-tight engagement there between to retain fluid within the fluid space.

In another embodiment in accordance with the present invention, an engine-driven heat generation system wherein the conductor assembly further comprising a fluid inlet and a fluid outlet, the conductor assembly adapted to provide a fluid passage within the fluid space. The fluid space is adapted such that fluid may be passed between the fluid inlet and the fluid outlet sufficient to provide heat transfer from the conductor plates to the fluid as the conductor plates are heated during operation.

In an embodiment in accordance with the present invention, a magnetic heater assembly comprises a blower including a motor, a blower housing, and a blower fan, and a magnetic heater including a magnet assembly. The blower housing defines an annular volume in fluid communication with an axial inlet and a tangential outlet. The blower fan includes a plurality of fan blades coupled to a conductive member. The magnet assembly comprises an axial shaft annulus. The magnet assembly is coaxially located within the annular volume. The blower fan is coaxially located within the annular volume such that the conductive member of the blower fan is located co-axially and adjacent the magnet assembly. The motor is coupled to the blower housing such that a shaft of the motor is located coaxially with the magnet assembly and the blower fan extending into the annular volume. The shaft extends into the annular volume, passing through the shaft annulus of the magnet assembly, and coupled in operative engagement to the conductive member so as to rotate the conductive member when in operation, the magnet assembly coupled to and fixed the blower housing.

In another embodiment in accordance with the present invention, a magnetic heater wherein the fan blades are adapted to act as heat sinks for the transfer of heat from the conductive member to the air.

The above embodiments are provided by way of example and in no way is to be limiting the scope of the invention.

BRIEF DESCRIPTION OF THE DRAWINGS

Like reference numbers generally indicate corresponding elements in the figures.

FIGS. 9A and 9B are side views of the magnetic heater comprising a spacing actuator for varying the conductor/magnet spacing, in accordance with an embodiment of the present invention;

DETAILED DESCRIPTION

Figure 1:
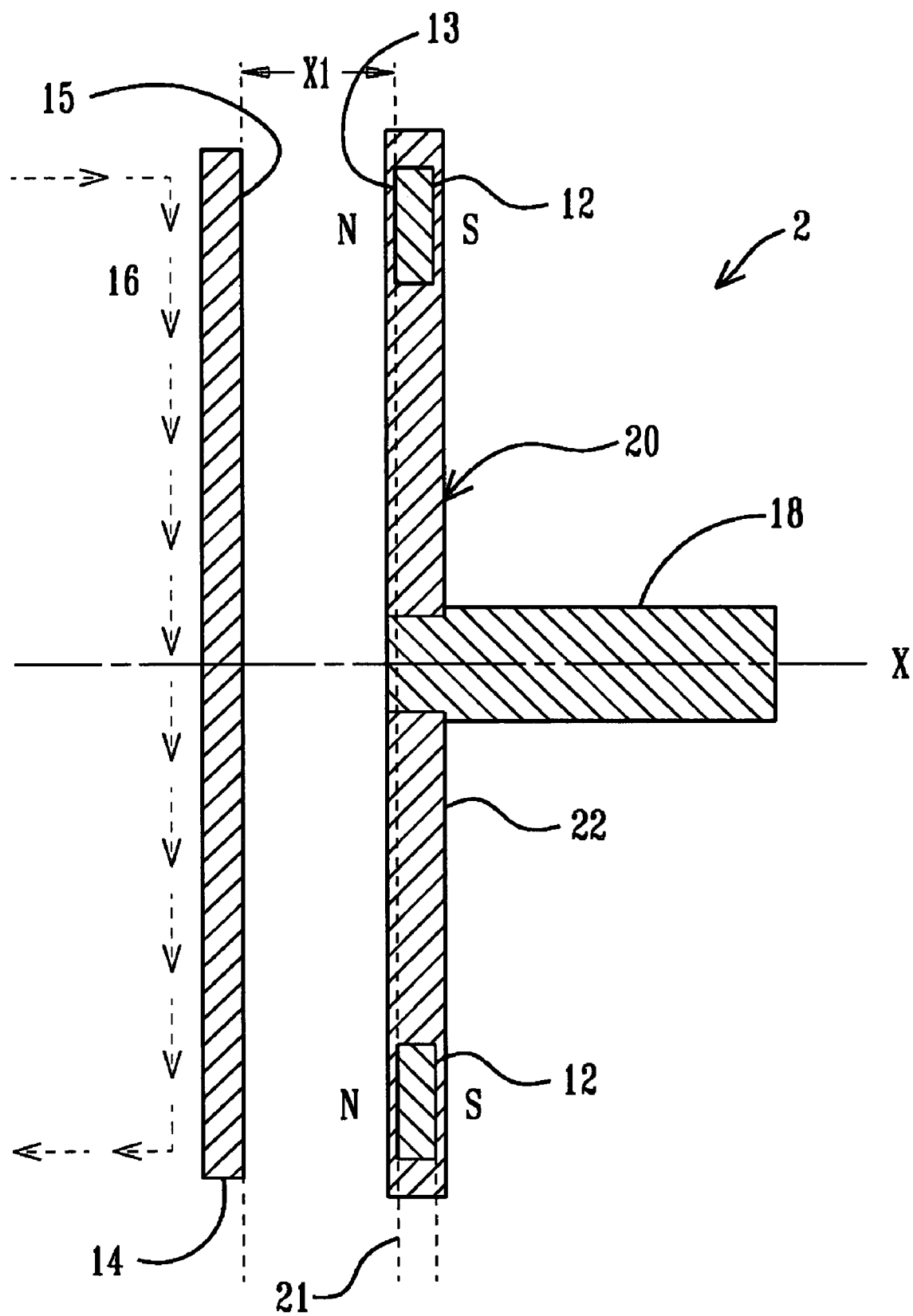
FIG. 1 is a side view of an embodiment of a magnetic heater, in accordance with the present invention.

FIG. 1 is a side view of an embodiment of a magnetic heater 2 in accordance with the present invention. The magnetic heater 2 comprises a magnet assembly 20 and a conductive member 14 disposed proximate the magnet assembly 20. Rotation of the magnet assembly 20 about an x-axis induces a predetermined cyclical variation of magnetic field within the conductive member 14.

Figure 2:
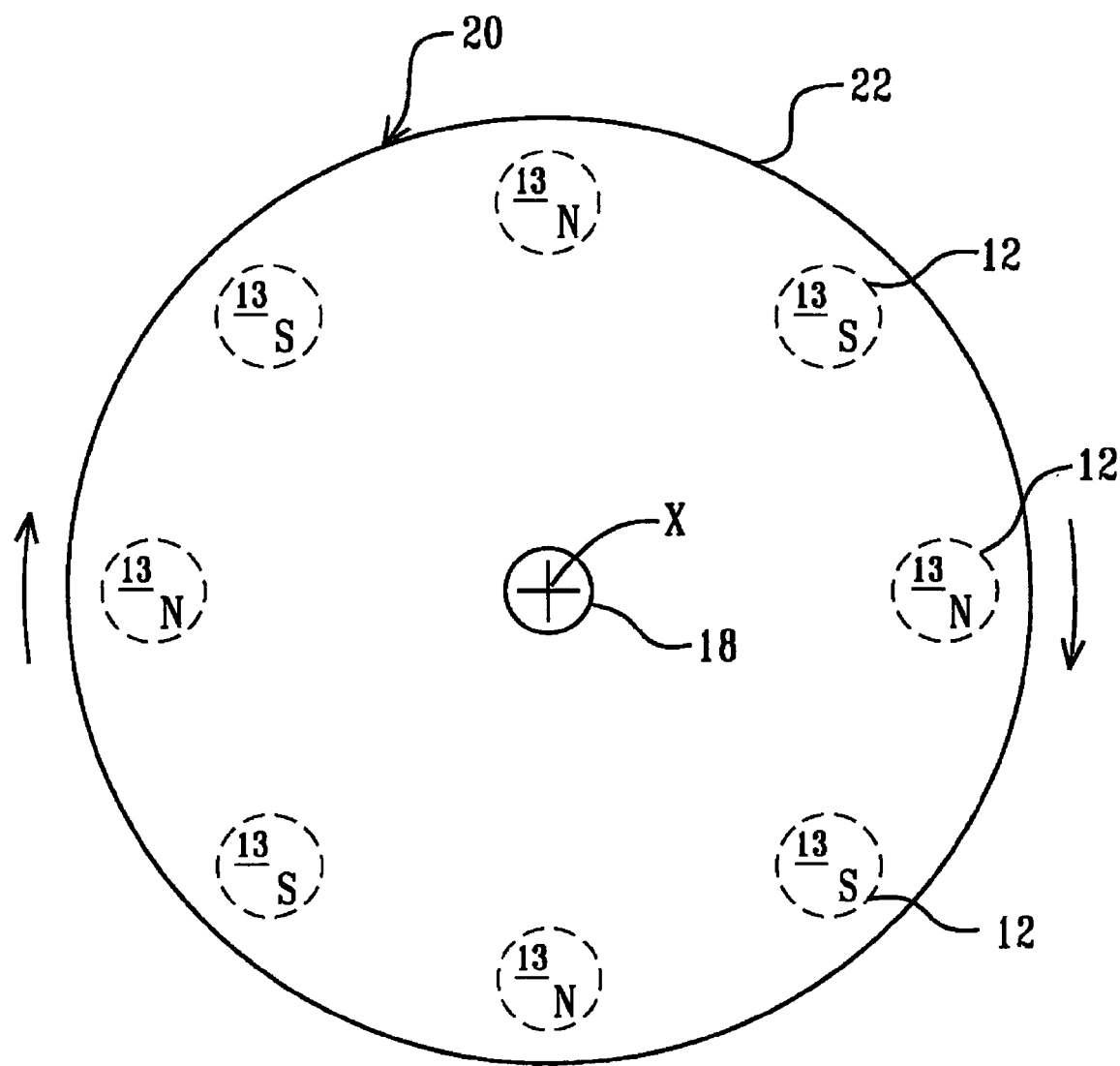
FIG. 2 is a front view of the magnet assembly of FIG. 1.

FIG. 2 is a front view of the magnet assembly 20 of FIG. 1. The magnet assembly 20 comprises a disk-shaped frame 22, a plurality of magnets 12, and a shaft 18. The plurality of magnets 12 are coupled to and arranged in a planar, generally circular, spaced-apart, orientation on the frame 22. The magnets 12 each have a first magnet surface 13 in a substantially planar relationship, referred herein as the first magnet plane 21, shown in FIG. 1. The shaft 18 is coupled substantially at the center of rotation of the frame 22. The center of rotation of the frame 22 defines the x-axis which is substantially perpendicular to the first magnet plane 21. The shaft 18 is adapted to couple with an energy source capable of imparting rotation to the shaft 18.

The conductive member 14 has a planar conductive member first side 15 in opposing, substantially parallel relationship with the first magnet plane 21. The conductive member first side 15 and the first magnetic plane 21 are spaced-apart a predetermined distance in opposing relationship referred herein as a conductor/magnet spacing X1. The conductive member 14 comprises an electrically-conductive material.

As the shaft 18 of the frame 22 is rotated, the magnets 12 move relative to the conductive member first side 15 of the conductive member 14. A given point on the conductive member 14 will; therefore, be exposed to a cyclically varying magnetic field as each of the magnets 12 approach, pass over, and retreat from adjacent that given point. The given point on the conductive member 14 will thus be heated as long as the given point is exposed to the time-varying magnetic field.

It is appreciated that the magnet assembly 20 can comprise one or more magnets 12. One magnet 12 is sufficient to expose a cyclically varying magnetic field onto the conductive member 14. Therefore, it is appreciated that when reference is made to a plurality of magnets 12, it applies also to embodiments comprising one magnet 12, and vice-versa.

In embodiments of the present invention, the magnets 12 are permanent magnets. Therefore, the magnets 12 have a substantially constant magnetic field strength. This is contrasted with an electromagnet, which has the capability of producing a range of magnetic field strength dependent on varying the current driving the electromagnet. Therefore, the strength of the magnetic field produced by the permanent magnets 12 that the conductive member 14 is exposed to primarily depends on the conductor/magnet spacing X1. The magnetic field strength of the permanent magnet 12 is referred to as the absolute magnetic field strength.

A fluid path 16 is defined such that heat transfer between the conductive member 14 and fluid moving within the fluid path 16 is enabled. Thus, as the conductive member 14 is heated, a fluid absorbs at least a portion of the heat generated. The fluid can thus be used to transport the heat to another location.

The radial and axial placement of the magnets 12 about the frame 22 as shown in FIGS. 1 and 2 is exemplary only. Placement of the magnets 12 about the frame 22 in other arrangements, orientations, spacing, among other things, in planar relationship or otherwise, is anticipated suitable for a particular purpose of imparting a magnetic field onto the conductive member 14 and/or onto additional conductive members 14. Furthermore, the magnets 12 need not be of the same size, shape, polar orientation, composition, or type, among other things.

In the embodiment of FIGS. 1 and 2, the magnets 12 are oriented such that the conductive member 14 is exposed to an alternating polarity from adjacent magnets 12, with their north poles N either pointing towards or away from the conductive member 14. Such an arrangement produces a relatively large range of variation in the magnetic field on the conductive member 14 as compared with, for example, wherein all of the magnets 12 present the same polarity to the conductive member 14.

Relative motion between the conductive member 14 and the magnets 12 is produced, wherein the magnets 12, are caused to rotate about the x-axis and holding the conductive member 14 stationary.

Figure 3:
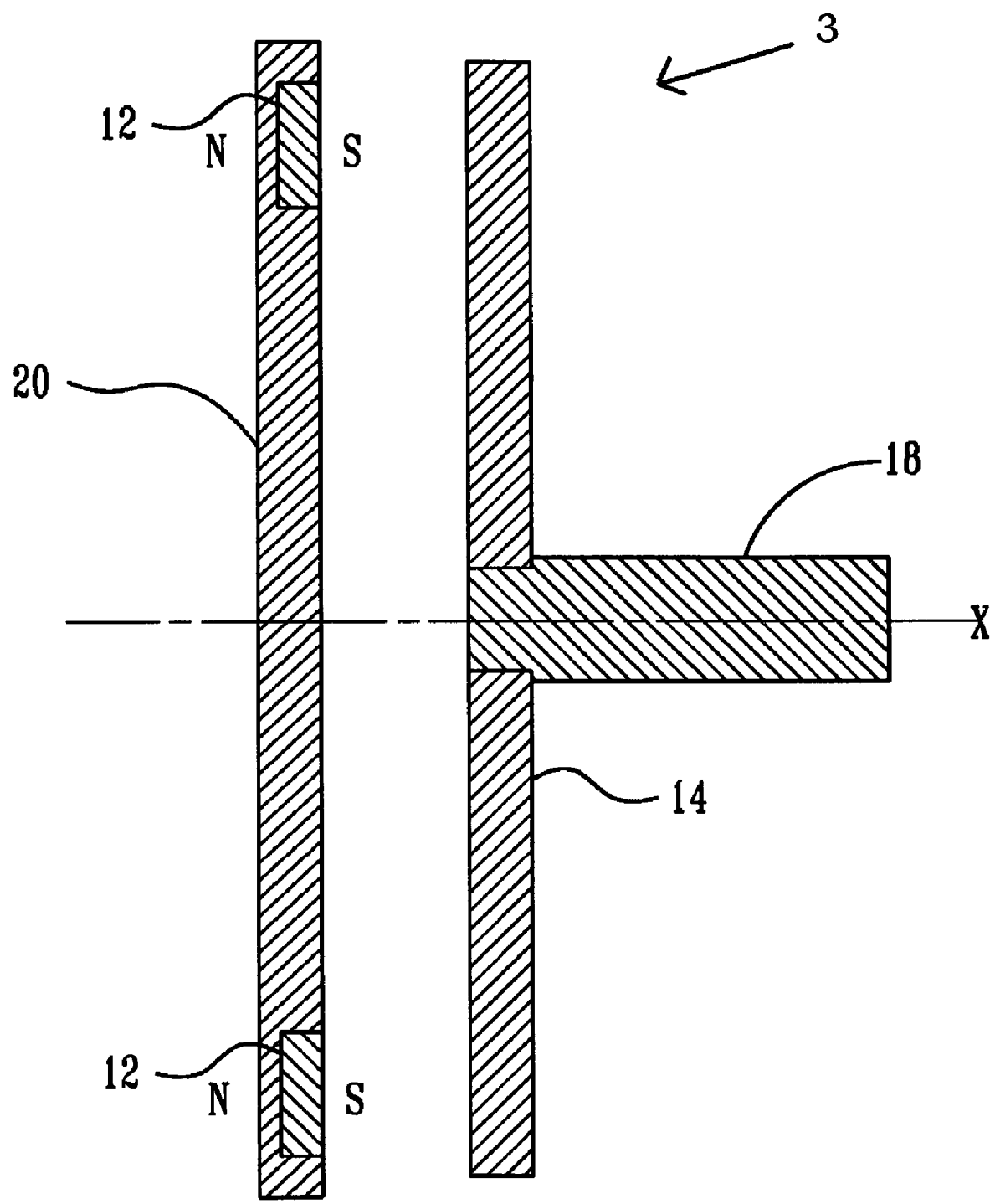
FIG. 3 is a side view of a magnetic heater, in accordance with an embodiment of the present invention.

FIG. 3 is a side cross-sectional view of a magnetic heater 3 wherein the conductive member 14 is caused to rotate about the x-axis and holding the magnet assembly 20, and thus, the magnets 12, stationary. The conductive member 14 is coupled to a shaft 18 that is coupled to an energy source suitable for rotating the shaft 18 about the x-axis.

It is understood that relative motion between the magnets 12 and the conductive member 14 can be produced, in accordance with embodiments of the present invention, by the above mentioned configurations, and by other configurations, such as, but not limited to, rotation of both the magnet assembly 20 and conductive member 14 at different rates in the same direction, and rotation of both the magnet assembly 20 and conductive member 14 in opposite directions.

The absolute magnetic field strength of the magnet 12 is a measure of the magnitude of the magnetic field generated by the magnet 12 at a point on the magnet 12. For permanent magnets, the absolute magnetic field strength is essentially fixed. For electromagnets, the absolute magnetic field strength depends on the amount of current passing through the magnets coils.

The magnetic field exerted on the conductive member 14 depends on, among other things, the absolute magnetic field strength of the magnet 12 and the conductor/magnet spacing X1 between the magnet 12 and the conductive member 14.

A variety of magnets 12 are suitable for embodiments of the present invention.

Permanent magnets 12 are advantageous for certain embodiments, for at least the reason that it is not necessary to supply electrical power to the magnets 12, hence no wiring or power source is needed for such purpose.

The rate of heat generation in a magnetic heater 2, 3 in accordance with embodiments of the present invention depends in part on the absolute magnetic field strength of the magnets 12. Therefore, for applications wherein a high rate of heat generation is desirable, it is also desirable that the magnets 12 have a relatively high absolute magnetic field strength.

In addition, the maximum temperature that can be generated by a magnetic heater 2, 3 according to embodiments of the present invention depends in part on the heat tolerance of the magnets 12. Permanent magnets have a "maximum effective operating temperature" above which their magnetic field begins to degrade significantly.

Electromagnets likewise suffer from decreased performance with increasing temperature, though the decrease is not as well defined as that of permanent magnets. For example, the resistance of the magnetic field coils in an electromagnet gradually increases with increasing temperature, which in turn gradually reduces the current flow at a given voltage, generating still more heat. Magnets of both types are available suitable for use at elevated temperatures.

Permanent magnets known as rare earth magnets, such as, but not limited to Samarium Cobalt magnets, have a relatively high absolute magnetic field strength and operating temperature, and are suitable for the particular purpose.

The conductive member 14 comprises an electrically conductive material suitable for the particular purpose. Suitable materials include, but are not limited to, copper, aluminum, alloys of copper, alloys of aluminum, and other metallic or non-metallic, electrically conductive substances. The conductive member 14 is adapted to enable induced eddy-currents within the conductive member 14 when exposed to a time-varying magnetic flux. The conductive member 14 of the embodiment of FIG. 1 is generally disc-shaped. The conductive member 14 is not particularly limited to a specific shape, size, or configuration. In other embodiments, the conductive member is formed in two or more pieces, as a thin conductive layer on a non-conductive substrate, having defined apertures therein, among other configurations.

Figure 4:
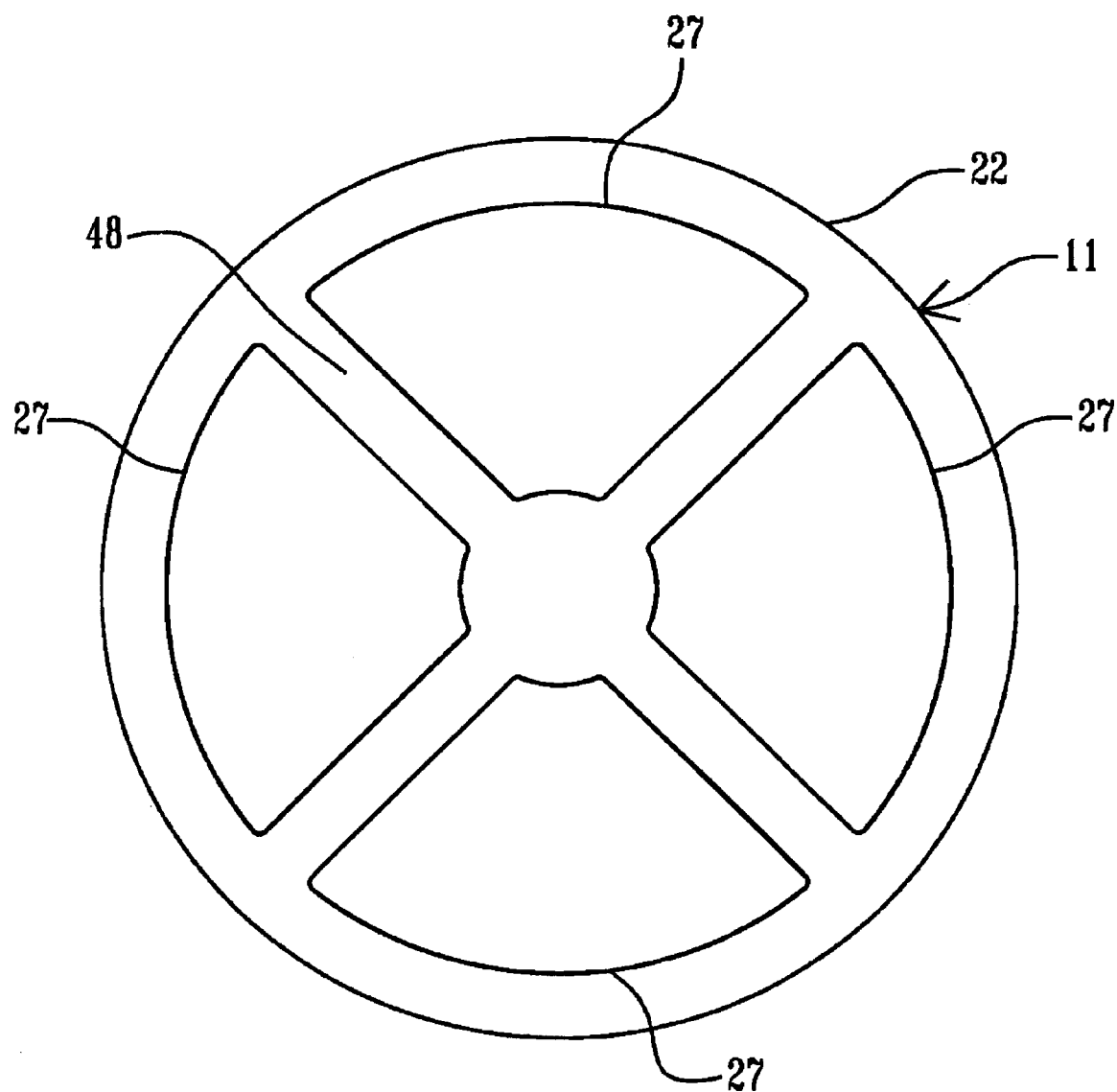
FIG. 4 is a front view of a conductive member comprising a plurality of separate conductors, in accordance with an embodiment of the present invention.

The conductive member need not consist of a closed loop or integral piece of conductive material. FIG. 4 is a front view of a conductive member assembly 11 comprising a plurality of separate conductors 27 that are separated from one another by non-conductive material 48 in accordance with an embodiment of the present invention. In such a case, each conductor 27 is heated independently.

Likewise, the conductive member 14, even if a single contiguous piece of conductive material, might be shaped with apertures, or be constructed of wires, beams, rods, etc., with empty space therebetween.

FIGS. 1 through 3 show the magnetic heater 2, 3 in simplified schematic form for clarity. It is understood that additional structure may be present to provide structural support for containment and alignment.

Figure 5:
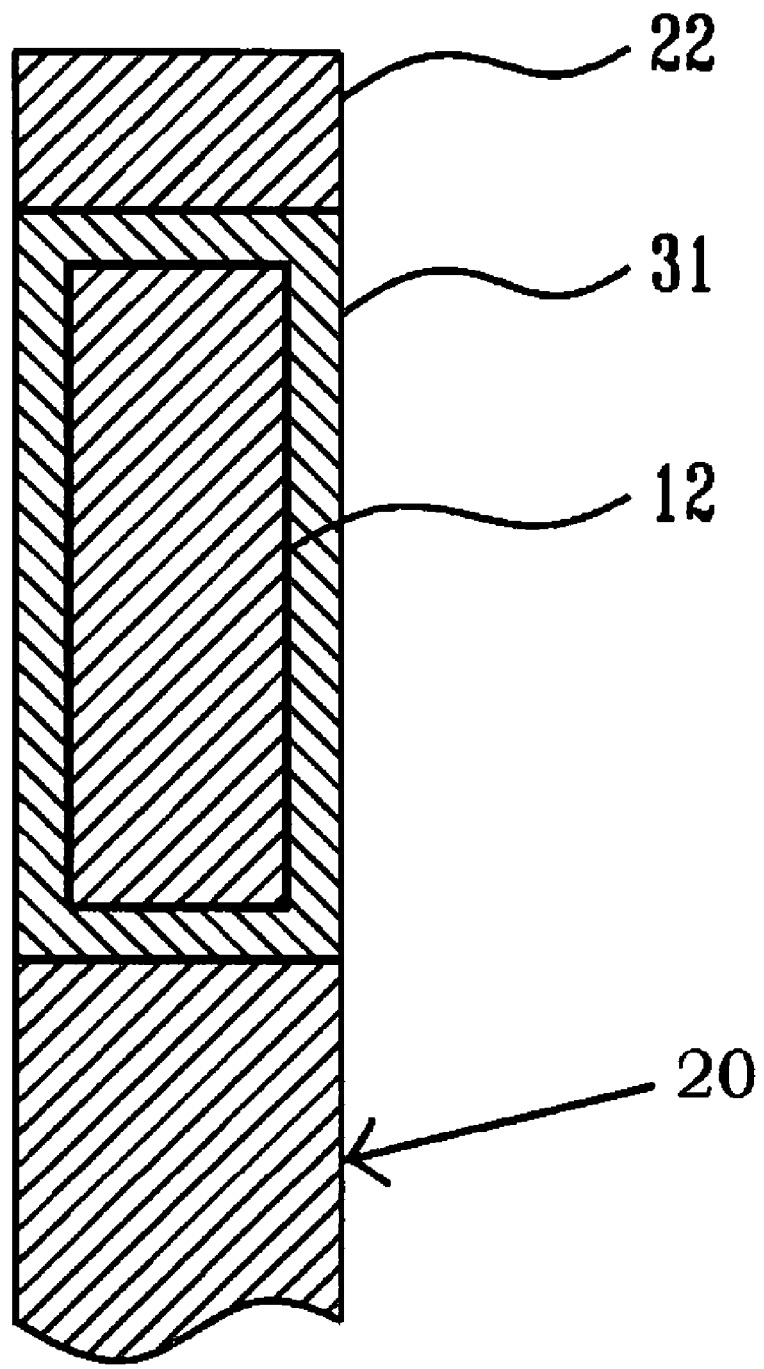
FIG. 5 is a portion of the frame with a cross-sectional view of a magnet and a protective layer provided on the exterior of the magnet, in accordance with an embodiment of the present invention.

FIG. 5 is a cross-sectional view of a portion of the magnet assembly 20 comprising a frame 22 with a magnet 12 and a protective layer 31 provided on the exterior of the magnet 12. The protective layer 31 is selected for a particular purpose, including, but not limited to, thermal protection, additional structural integrity, and chemical protection.

A variety of materials are suitable for use as the protective layer 31, so long as they do not significantly reduce the propagation of the magnetic field of the magnet 12.

In one embodiment, the protective layer 31 comprises aluminum. It is noted that aluminum has a high reflectivity, thus inhibiting the absorption of heat by the magnet 12, and a high infrared emissivity, thus facilitating the rapid re-radiation of heat away from the magnet 12. These properties combine to provide passive cooling for the magnet 12. In addition, aluminum is relatively durable, and so a protective layer 31 of aluminum serves to protect the magnet 12 physically. Likewise, aluminum is relatively impermeable, and thus may effectively seal the magnet 12 against any potential corrosive effects due to moisture, oxygen, fluid flowing through the fluid path 16 (see below), among other things.

In addition, in other embodiments, the magnetic heater 2, 3 may include an additional active or passive cooling mechanism for the magnets 12. A wide variety of cooling mechanisms are suitable for the particular purpose. For example, passive cooling mechanisms include, but are not limited to, heat sinks and radiator fins. Active cooling mechanisms include, but are not limited to, coolant loops and refrigeration units.

It is noted that the fluid flow path 16, as described below, may be configured to act as a cooling mechanism. In some embodiments of the present invention, fluid is used to provide a mechanism for absorbing heat from the conductive member 14, and it is well suited for absorbing heat from the magnets 12 as well.

In other embodiments in accordance with the present invention, heat is generated for use via direct conduction or radiation from the conductive member 14. For example, heat could be transferred from the conductive member 14 to a solid heat conductor, heat sink, or heat storage device, such as, but not limited to, a mass of ceramic, brick, stone, etc.

Figure 6:
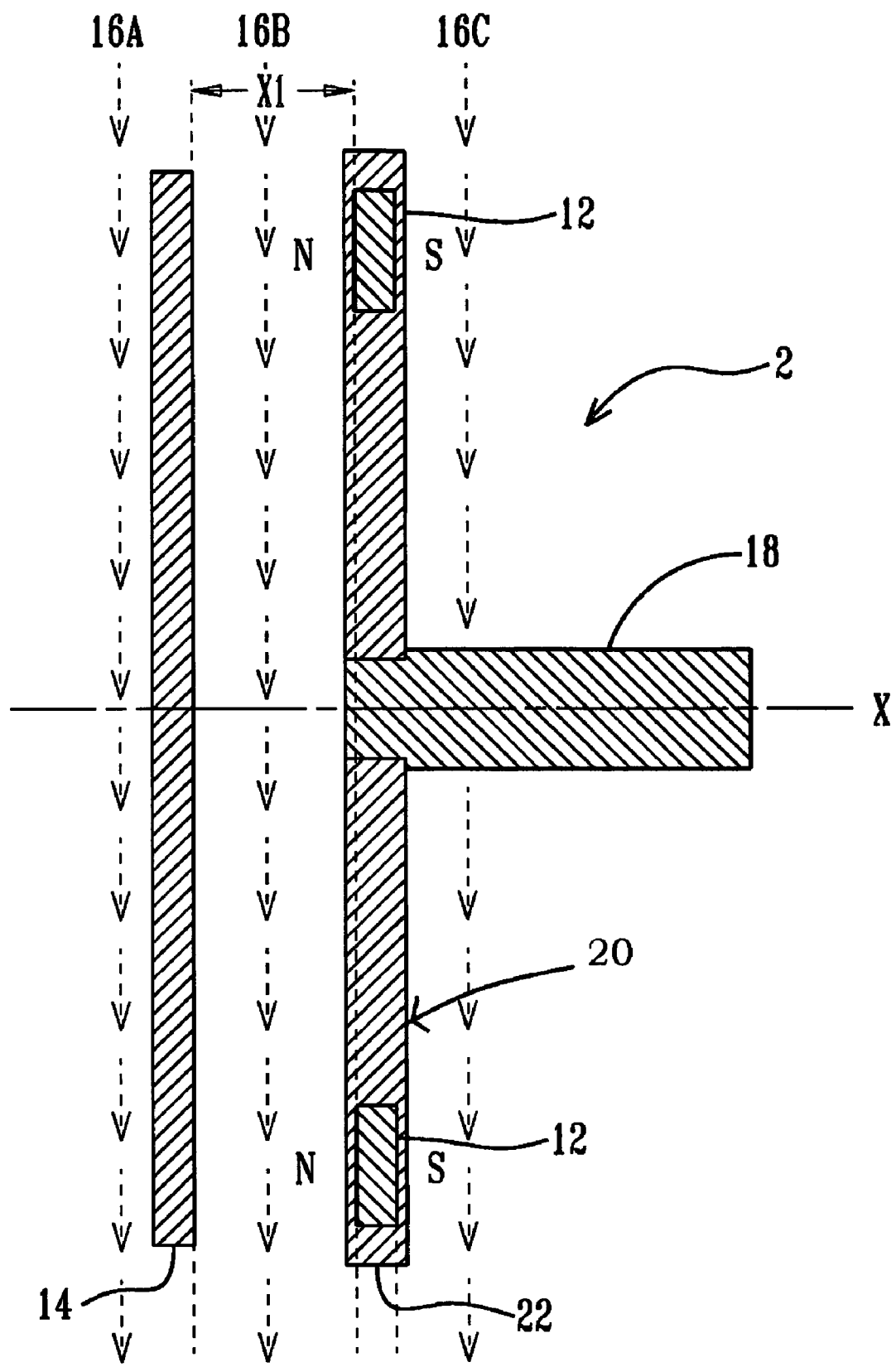
FIG. 6 is a side view of an embodiment of a magnetic heater, in accordance with the present invention.

FIG. 6 is a side cross-sectional view of the magnetic heater 2 wherein the fluid path 16 is defined so that at least a portion thereof extends between the magnets 12 of the magnet assembly 20 and the conductive member 14 in accordance with embodiments of the present invention. The fluid path 16 extends substantially parallel with the conductive member 14 and the magnets 12, between the magnets 12 and the conductive member 14.

Suitable fluids for the particular purpose include, but are not limited to, gaseous fluids such as air and liquid fluids such as water. When the conductive member 14 is heated, fluid in the fluid path 16 receives heat from conductive member 14. Heat transfer from the conductive member 14 to fluid in the fluid path 16 may occur via one or more of conduction, convection, and radiation.

Figure 7:
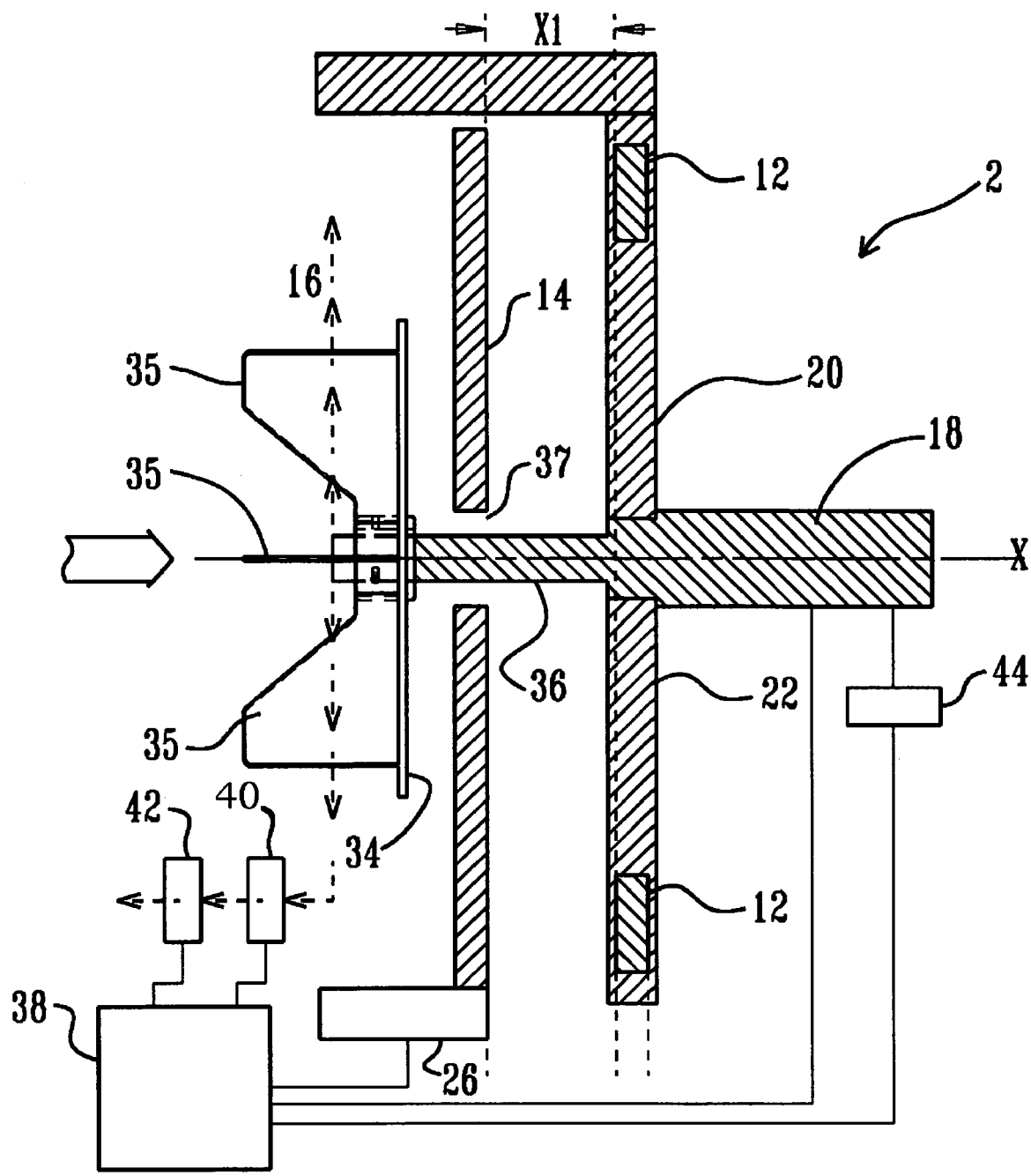
FIG. 7 is a side view of a magnetic heater, in accordance with an embodiment of the present invention.
Figure 8:
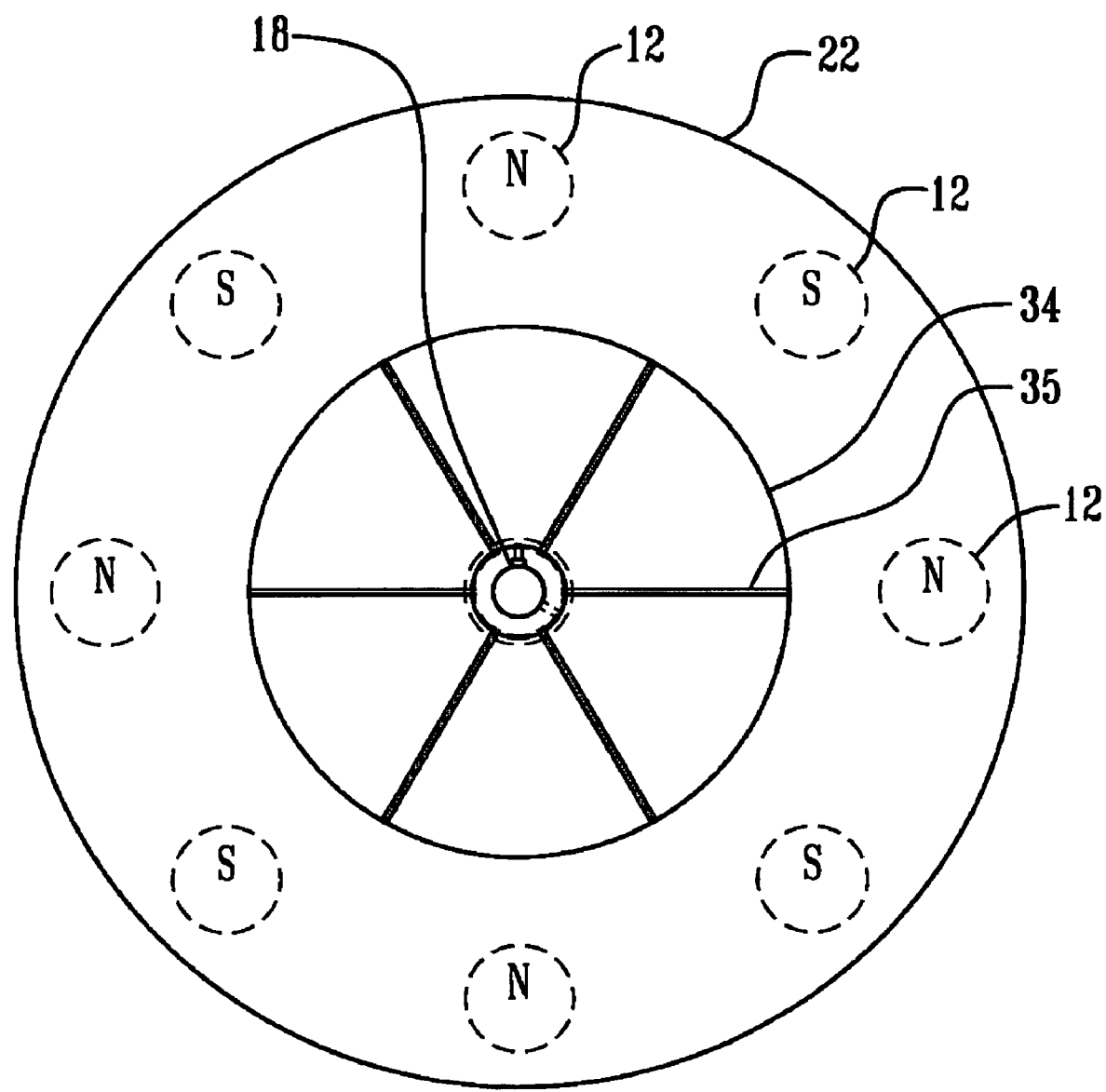
FIG. 8 is a front view of the embodiment of FIG. 7.

FIGS. 7 and 8 are side and front views of an embodiment of the magnetic heater 2 further comprising a fluid driver 34 engaged with a fluid path 16 for driving fluid therethrough, in accordance with the present invention. The fluid driver 34 comprises a plurality of fins 35 or blades and a driver shaft 36. Examples of suitable fluid drivers 34 include, but are not limited to, finned rotors, squirrel cages, and fans. In the embodiment of FIG. 7, the driver shaft 36 extends through an aperture 37 in the conductive member 14 and is coupled to the frame 22 on which the magnets 12 are arranged. The driving action is provided by rotation of the frame 22, which turns the fluid driver 34 in a predetermined direction. Thus, the speed of operation of the fluid driver 34 therein depends on the speed of motion of the frame 22, and likewise the rate of fluid flow within the fluid path 16. In other embodiments, the driver shaft 36 is coupled to, among other things, the shaft 18 or an external energy source.

In an embodiment wherein the conductive member 14 rather than the frame 22 moves to produce the cyclically varying magnetic field, the fluid driver 34 is driven by the rotation of the conductive member 14.

It is appreciated that the temperature to which fluid passing through the fluid path 16 is heated depends on the rate of heat generation in the conductive member 14, that is, on the amount of heat available to warm the fluid. Also, the temperature of the fluid depends on the rate at which the fluid moves through the fluid path 16, that is, on how much fluid is available to absorb the heat that is generated. Further, the temperature of the fluid depends on the efficiency of the conductive member 14 is releasing its heat to the fluid.

Also because the parameters, including rate of heat generation, rate of fluid flow, and fluid temperature, are independent of one another as described in some embodiments herein, a magnetic heater 2 in accordance with embodiments of the present invention is used to produce a specific temperature of fluid in combination with a specific quantity of fluid flow. Any two of the three parameters can be controlled independently of one another.

The energy source used to drive the shaft 18 can comprise any suitable means.

In embodiments in accordance with the present invention, the shaft 18 is coupled with a power take-off found on some motor vehicles, such as, but not limited to, many tractors, other agricultural vehicles, and heavy work vehicles. In such vehicles, some or all of the mechanical driving force generated by the engine is transferred to the power take-off to impart rotation, such as to the shaft 18. Conventional power take-offs include a rotatable coupling or other movable component, which is engaged with a linkage to impart rotation to the shaft 18.

In other embodiments, the shaft 18 comprises a hydraulic linkage. Certain vehicles include hydraulic systems, such as, but not limited to, for actuating a snow plow or shovel blade, for tipping a truck bed, or for operating a fork lift. The hydraulic system is adapted to couple with a piece of supplemental equipment, such as a hydraulic motor, with suitable linkage adapted to couple with the shaft 18, to provide power thereto. Hydraulic systems and hydraulic linkages are known in the art, and are not described in detail herein.

Various embodiments are anticipated so as to control the rate of heat output of the magnetic heater 2.

FIGS. 9A and 9B are side cross-sectional views of the magnetic heater 2 of FIG. 1, further comprising a spacing actuator 26 for varying the conductor/magnet spacing X1, in accordance with an embodiment of the present invention. The spacing actuator 26 varies the conductor/magnet spacing X1 between the conductive member first side 15 and the first magnet surface 13 along the x-axis.

The strength of the magnetic field exerted on a given portion of the conductive member 14 depends in part on the conductor/magnet spacing X1 between the magnets 12 and the conductive member 14. A change in the conductor/magnet spacing X1 changes the magnetic field strength to which the conductive member 14 is exposed, and thus changes the range of variation of the magnetic field over a cycle (the cyclical variation of the magnetic field), which changes the rate at which heat is generated in the conductive member 14. For permanent magnets, the cyclical variation of the magnetic field is accomplished while the absolute magnitude of the magnetic field strength remains substantially constant.

Reducing the conductor/magnet spacing X1 increases the magnetic field strength on the conductive member 14 and increases the magnetic induction, thus increasing the heating of the conductive member 14. Increasing the conductor/magnet spacing X1 reduces the magnetic field strength on the conductive member 14 and reduces the magnetic induction, thus reducing the heating of the conductive member 14.

In embodiments wherein it is desirable to enable a relatively high maximum rate of heat generation, it is desirable that a minimum value of the conductor/magnet spacing X1 between the conductive member 14 and the magnets 12 be as small as is practical. Similarly, in embodiments wherein it is desirable to enable a high range of variability in the rate of heat generation, it is desirable that the range of possible values for the conductor/magnet spacing X1 between the conductive member 14 and the magnets 12 is relatively large.

The conductor/magnet spacing X1 is a parameter that is independent of the rate of motion of the magnets 12 with respect to the conductive member 14, and thus independent of the rate of cyclical variation of the magnetic field. Thus, the rate of heat generation of the magnetic heater 2 is adjustable by varying the conductor/magnet spacing X1 without changing the period of cyclical variation of the magnet magnetic field.

Likewise, the conductor/magnet spacing X1 is independent of the absolute magnetic field strength of the magnets 12. Thus, the rate of heat generation of the magnetic heater 2 is adjustable by varying the conductor/magnet spacing X1 without changing the absolute magnetic field strength of the magnets 12. What is changing with varying the conductor/magnet spacing X1, among other things, is the magnitude of the magnetic field that the conductive member 14 is exposed to. The rate of heat generation of the magnetic heater 2 is adjustable while it is generating heat by adjusting the conductor/magnet spacing X1.

The spacing actuator 26 is engaged with either the magnet assembly 20 or the conductive member 14 so as to vary the conductor/magnet spacing X1 therebetween. In other embodiments, the magnetic heater 2 comprises separate spacing actuators 26 engaged with the magnet assembly 20 and the conductive member 14. Such arrangements facilitate adjustment of the conductor/magnet spacing X1, and consequently facilitates adjustment of the rate of heat generation. In an embodiment in accordance with the present invention, the spacing actuator 26 is used to facilitate adjustment of the conductor/magnet spacing X1 while the magnetic heater 2 is generating heat.

A variety of actuators are suitable for use as the spacing actuator 26. In one embodiment, as schematically illustrated in FIGS. 9A and 9B, the spacing actuator 26 is a simple linear actuator, engaged with the conductive member 14 to move it toward or away from the magnet assembly 20, thereby adjusting the conductor/magnet spacing from X1 to X2.

In an embodiment in accordance with the present invention, the spacing actuator 26 is a manual actuator, such as, but not limited to, a threaded screw controlled by a hand-turned knob. In other embodiments, the spacing actuator 26 is a powered actuator, such as, but not limited to, an electrically or hydraulically driven mechanism.

Referring again to FIG. 7, the magnetic heater 2 further comprises a controller 38. The controller 38 is in communication with the spacing actuator 26, so as to control the conductor/magnet spacing X1. The controller 38 also is in communication with the shaft 18, so as to control the speed of motion of the magnet assembly 20, and therefore, the magnets 12, which derive their motion from the shaft 18, wherein the output of the motive device driving the shaft 18 is variable and controllable.

The fluid driver 34 is engaged with the magnet assembly 20 so that the speed of operation of the fluid driver 34, and consequently the rate of fluid flow along the fluid path 16, also is determined by the speed of motion of the magnet assembly 20.

The controller 38 in FIG. 7 thus controls the rate of heat generation by controlling the conductor/magnet spacing X1, and also controls the rate of fluid flow by controlling the rate at which the fluid driver 34 operates. By controlling these two parameters independently, the temperature of the fluid also can be controlled as described previously.

A variety of devices are suitable for use as a controller 38, including, but not limited to, integrated circuits. Controllers are known in the art, and are not described further herein.

Although the embodiment in FIG. 7 shows the controller 38 in communication with various sensors 40, 42, it is emphasized that this is exemplary only. In other embodiments, the controller 38 controls the operation of the magnetic heater 2 without sensors or data therefrom. In embodiments in accordance with the present invention, the controller 38 comprises stored data and/or a pre-calculated algorithm, based on, among other things, the design of the magnetic heater 2 and the performance of similar magnetic heaters 2. The controller 38 controls the magnetic heater 2 to produce the desired levels of heat generation, fluid temperature, and/or rate of fluid flow, without the need for active sensors to monitor the parameters of the magnetic heater 2 itself.

The embodiment in FIG. 7 includes a fluid temperature sensor 40, for sensing the temperature of fluid moving along the fluid path 16. It also includes a fluid flow rate sensor 42, for sensing the rate of fluid flow through the fluid path 16. It further includes a drive sensor 44, for sensing the rate at which the magnet assembly 20 is driven by the shaft 18. The controller 38 is in communication with each of the sensors 40, 42, and 44.

Based on data from the sensors 40, 42, and 44, the controller 38 adjusts the speed of the magnet assembly 20, the speed of the fluid driver 34, and/or the conductor/magnet spacing X1, so as to control heat generation, fluid temperature, and/or fluid flow.

It is emphasized that the arrangement of the sensors 40, 42, and 44 as shown is exemplary only. It is not necessary for a particular embodiment to include sensors at all, or to include each of the sensors 40, 42, and 44 shown in FIG. 7. In other embodiments, other sensors are included in the magnetic heater 2 in addition to or in place of those shown.

In an embodiment, the magnetic heater 2 comprises an additional sensor adapted to sense the conductor/magnet spacing X1 between the magnets 12 and the conductive member 14.

A variety of sensors are suitable for use in a magnetic heater 2 according to embodiments of the present invention, depending upon the particulars of the specific embodiment of the magnetic heater 2 and the type of information that is to be sensed. Sensors are known in the art, and are not described further herein.

Figure 10:
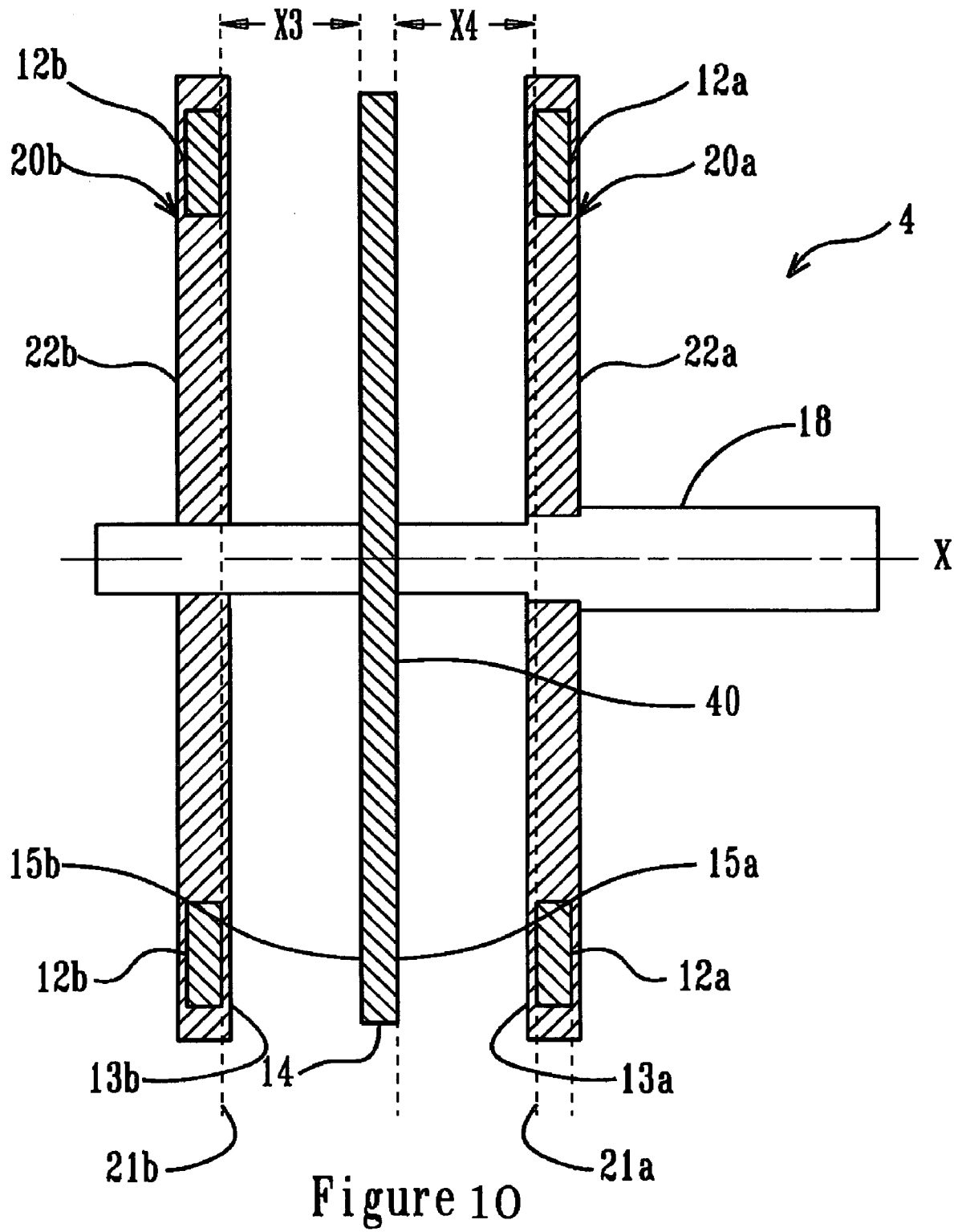
FIG. 10 is a side view of a radially moving magnet relative to a conductive member, in accordance with an embodiment of the present invention.

FIG. 10 is a side cross-sectional view of a magnetic heater 4 in accordance with an embodiment of the present invention. A conductive member 14 comprises a conductive member first side 15a and a conductive member second side 15b. A first magnet assembly 20a comprising a first frame 22a and a plurality of first magnets 12a thereon is disposed a first spacing X3 away from the conductive member first side 15a.

Similarly, a second magnet assembly 20b comprising a second frame 22b and a plurality of second magnets 12b thereon is disposed a second spacing X4 away from the conductive member second side 15b of the conductive member 14.

The first and second magnet assemblies 20a, 20b are disposed adjacent the conductive member first and second sides 15a, 15b, respectively, such that the magnets 12a and 12b, respectively, are aligned with one another to form opposing pairs on each side 15a, 15b of the conductive member 14. In an embodiment wherein the first and second magnet assemblies 20a, 20b are movable, they are movable together or independently so as to maintain in opposing magnets pairs.

Figure 11:
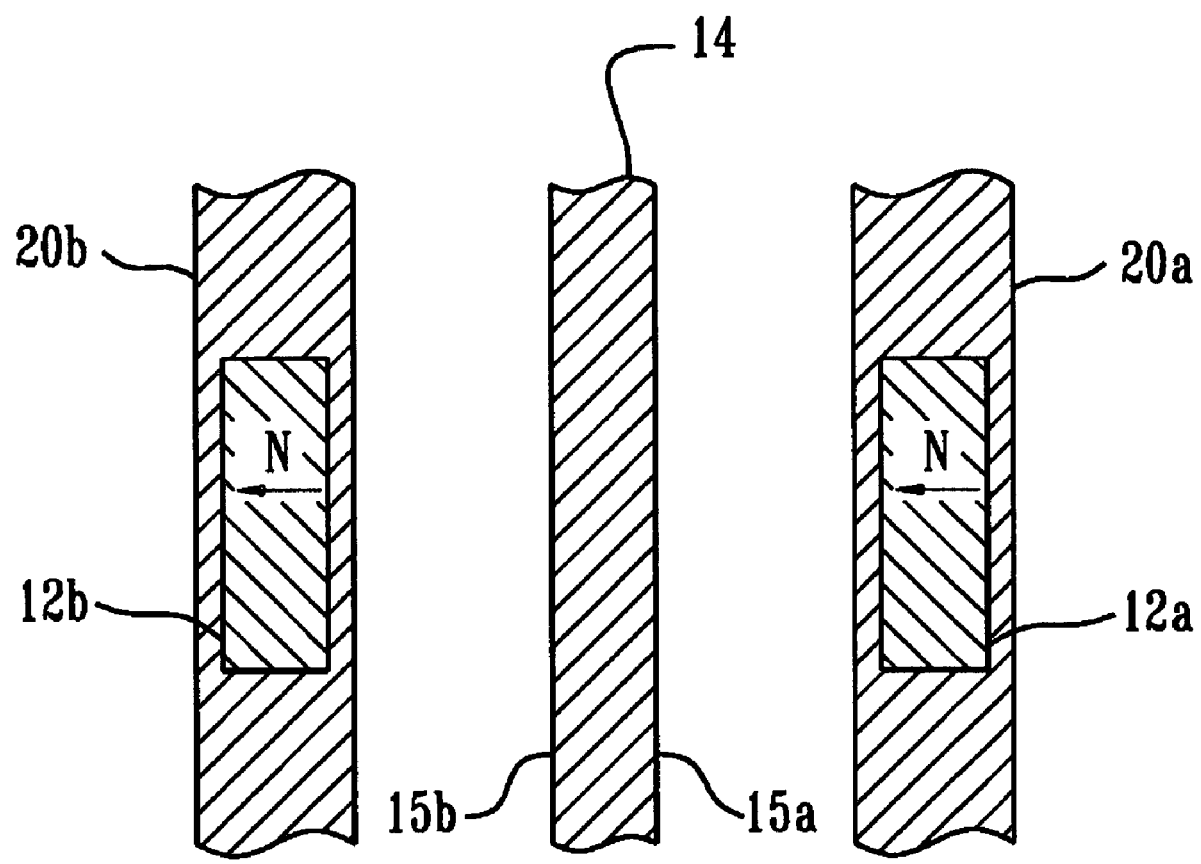
FIG. 11 is a partial view of the embodiment of FIG. 10, wherein different polarities of opposing magnets face the conductive member, in accordance with an embodiment of the present invention.

FIG. 11 is a cross-sectional partial view of the embodiment of FIG. 10, wherein different polarities of opposing magnets 12a, 12b face the conductive member 14, to present a predetermined gradient in the magnetic field. In another embodiment (not shown), the same polarity of opposing magnets 12a, 12b face the conductive member 14, to present a predetermined gradient in the magnetic field that is produced.

Figure 12:
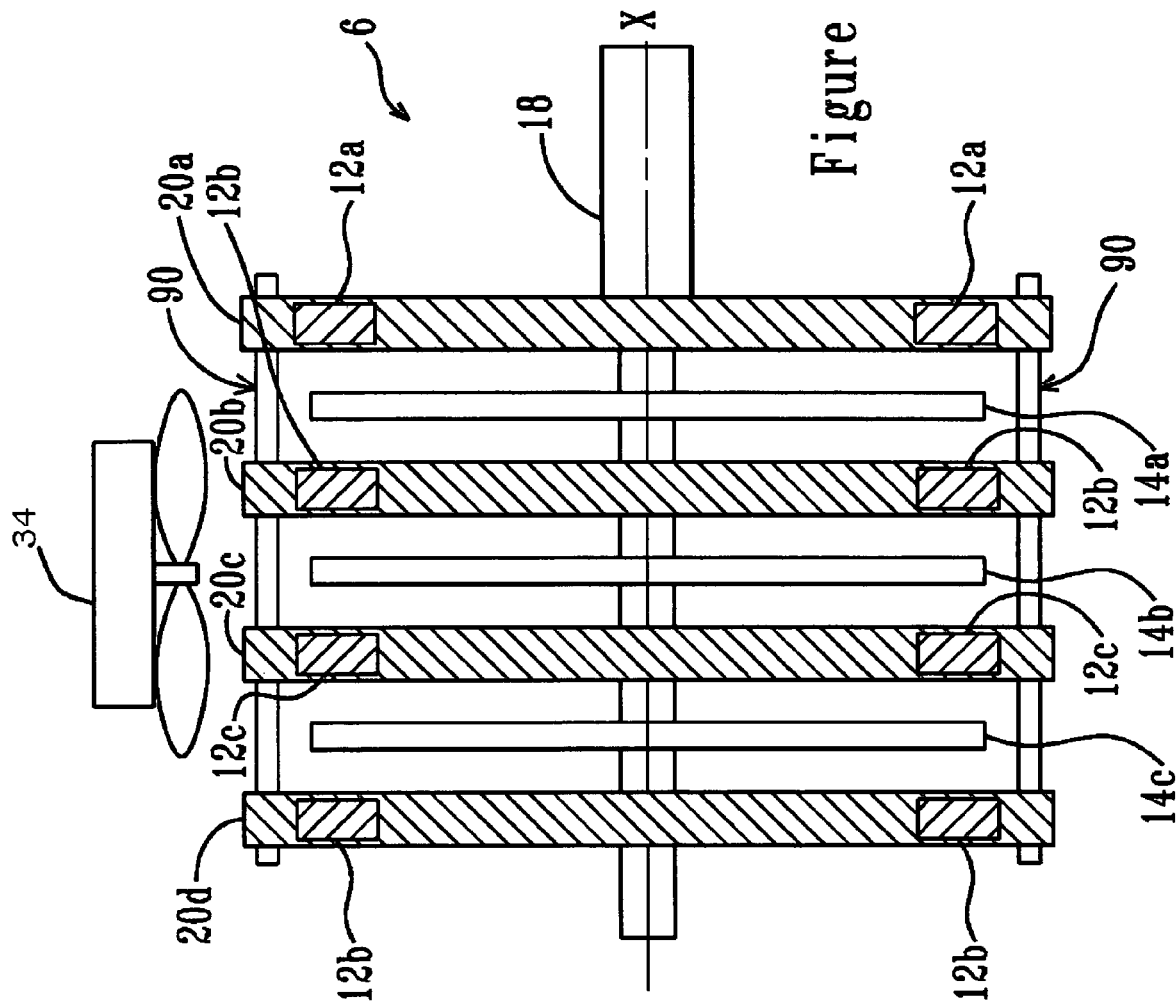
FIG. 12 is a multi-stage magnetic heater, in accordance with an embodiment of the present invention.

FIG. 12 is a side cross-sectional view of an embodiment of a multi-stage magnetic heater 6, in accordance with the present invention. As with the embodiment shown in FIG. 1, the embodiment of FIG. 10 may be conveniently expanded by the use of additional conductive members 14 and magnet assemblies 20. The embodiment of FIG. 12 comprises an arrangement with three conductive members 14a–c and four magnet assemblies 20a–d. It is noted that the number of conductive members 14 and magnet assemblies 20 is exemplary only, and that other numbers and arrangements may be suitable for a particular purpose. A fluid driver 34 is shown adjacent the conductive members 14 and magnet assemblies 20.

The multi-stage magnetic heater 6 further comprises support bracing 90 coupling the plurality of magnet assemblies 20a–d in relative axial alignment. It is appreciated that the operation of the magnetic heater 6 is effective whether the magnet assemblies 14a–d or the conductive members 14a–c are driven to rotation by the shaft 18.

Figure 13A:
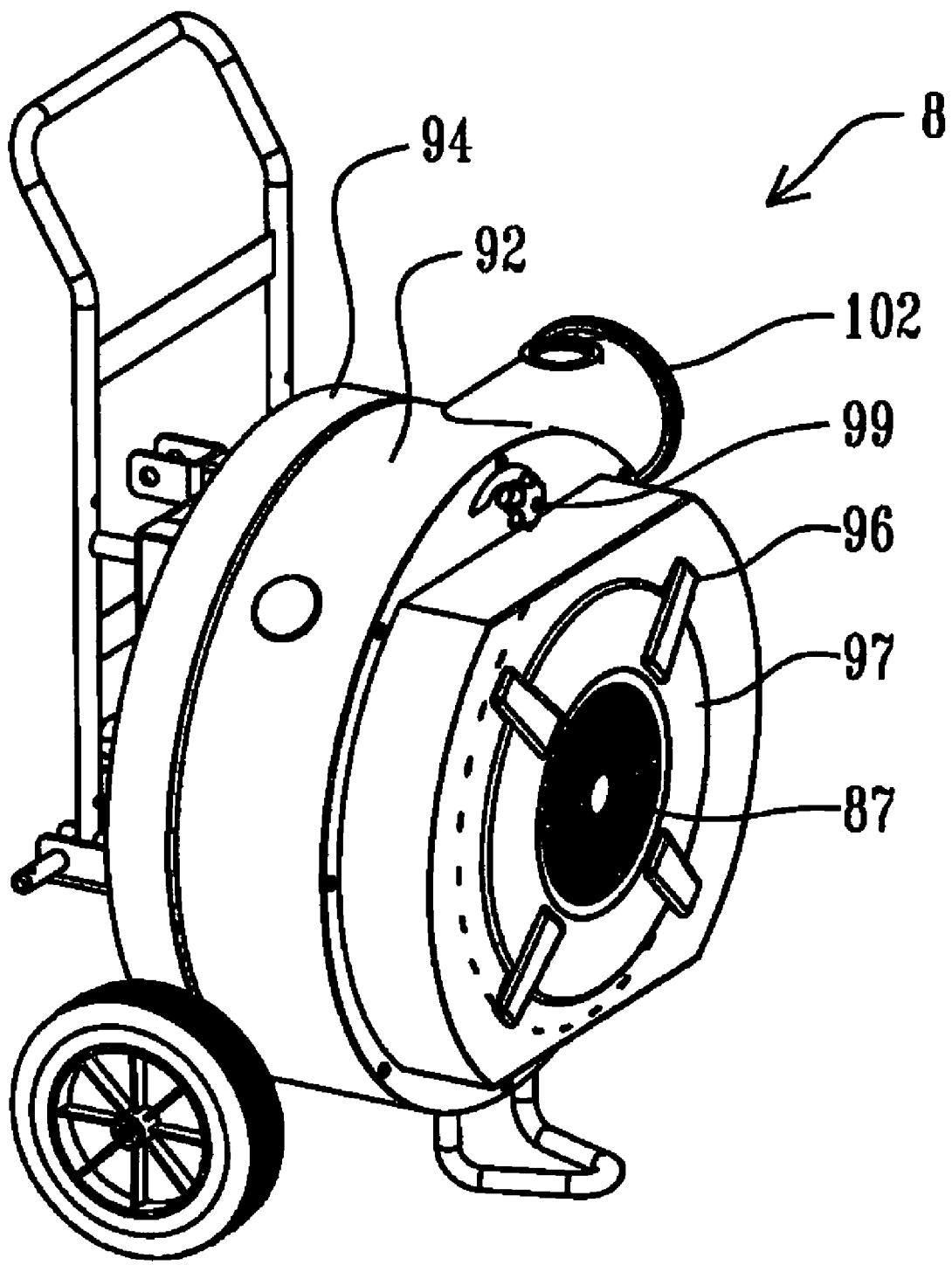
FIG. 13A is a perspective view of a magnetic heater apparatus, in accordance with an embodiment of the present invention.
Figure 13B:
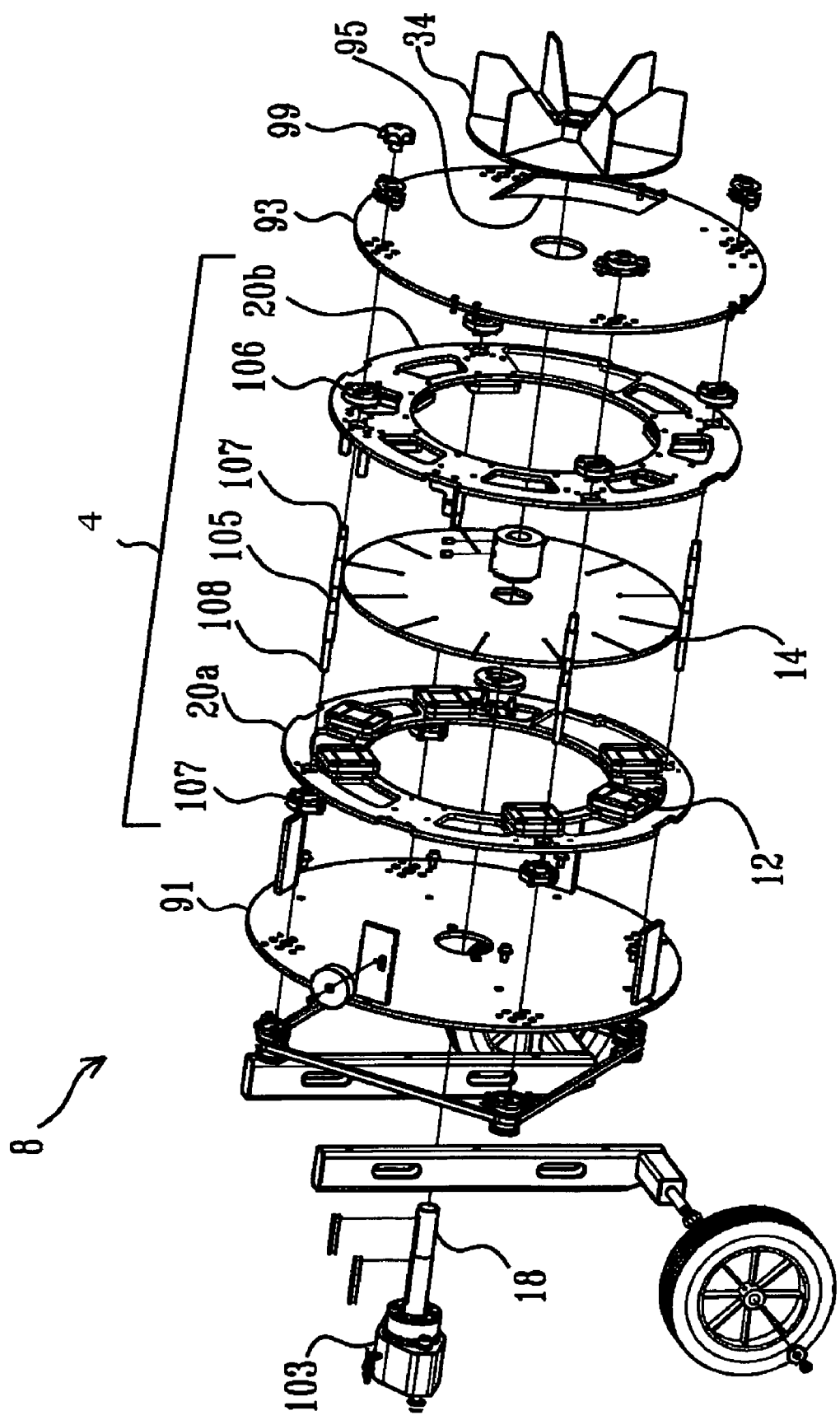
FIG. 13B is an exploded view of the magnetic heater apparatus of FIG. 13A.

FIGS. 13A and 13B are assembled and exploded views, respectively, of a magnetic heater apparatus 8 in accordance with an embodiment of the present invention. The magnetic heater apparatus 8 comprises a rear housing 94, a first end plate 91, a heater housing 92, a magnetic heater 6, a second end plate 93, a blower housing 96, and an air intake screen 97.

The magnetic heater 4, in accordance with the embodiment of FIG. 10, comprises a shaft 18, a first magnet assembly 20a, a conductive member 14, a second magnet assembly 20b and a fluid driver 34. The first and second magnet assemblies 20a, 20b comprise a plurality of magnets 12. The conductive member 14 is disposed between and coaxial with the first and second magnet assemblies 20a, 20b. The conductive member 14 is coupled with the shaft 18 and adapted to rotate with respect to the first and second magnet assemblies 20a, 20b. The shaft 18 is adapted to couple with an energy source 103.

The rear housing 94 is coupled adjacent the first end plate 91, both comprising apertures to allow the shaft 18 to pass there through. The first end plate is coupled adjacent the heater housing 92 defining a volume adapted to contain the first and second magnet assemblies 20a, 20b and conductive member 14. The second end plate 93 is coupled adjacent the heater housing 92 defining a side of the volume. The heater housing 92 comprises a fluid outlet 102. The second end plate 93 comprises a second end plate aperture 95 defining a portion of a fluid path. The fluid driver 34 is coupled to the shaft 18 and located adjacent the second end panel 93 on the opposite side from the second magnet assembly 20b. The blower housing 96 is coupled adjacent the second end panel 93 enclosing the fluid driver 34 there between. The blower housing 96 defines a fluid inlet aperture 87 defining a portion of the fluid path. The air intake screen 97 is coupled to the blower housing 96 covering the fluid inlet aperture 87.

A fluid path is defined by the fluid inlet aperture 87, the fluid driver 34, the second end plate aperture 95, the heater housing 92 and the fluid outlet 102. Fluid is drawn into the fluid inlet aperture 87 by the rotation of the fluid driver 34. The fluid driver 34 directs the fluid through the second end plate aperture 95 and circulates the fluid past the conductive member 14 in the heater housing 92. The heater housing 92 directs the fluid to the fluid outlet 102.

The magnetic heater apparatus 8 further comprises a spacing adjustment assembly 103 comprising a knob 99, a threaded spacer 105 having a first spacer end 108 and a second spacer end 109, a first retention coupler 107 and a second retention coupler 106. The first retention coupler 107 is positioned adjacent the first magnet assembly 20a and the second retention coupler 109 is positioned adjacent the second magnet assembly 20b. The threaded spacer 105 is disposed between the first and second magnet assemblies 20a, 20b, the first spacer end 108 coupled with the first retention coupler 107. The second spacer end 109 is passed through the second retention coupler 106 and coupled to the knob 99. Turning the knob 99 in a first direction reduces the spacing between the first and second magnet assemblies 20a, 20b. Turning the knob 99 in the opposite direction increases the spacing between the first and second magnet assemblies 20a, 20b.

Figure 14A:
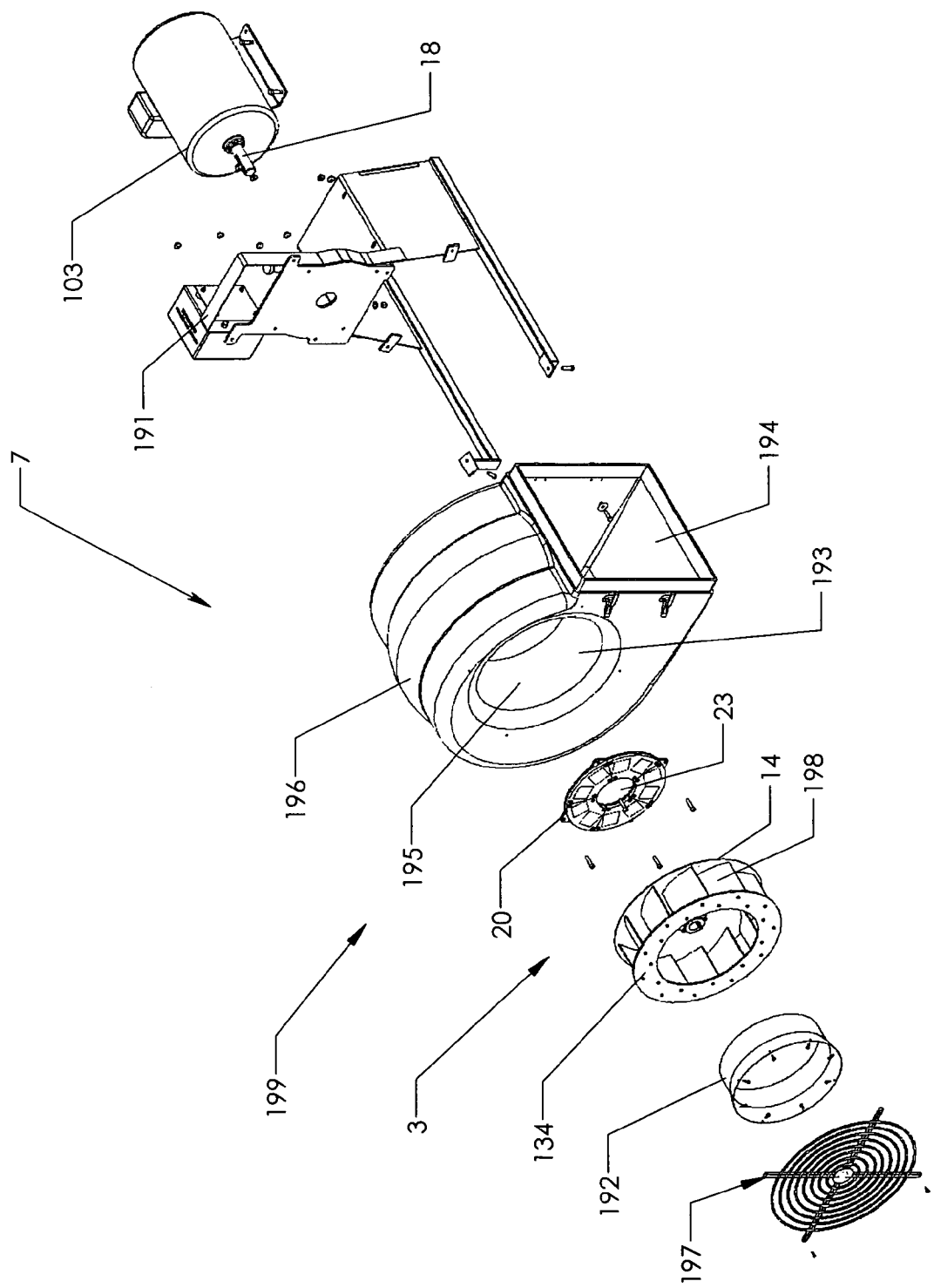
FIG. 14A is a perspective exploded view of a magnetic heater apparatus, in accordance with another embodiment of the present invention.
Figure 14B:
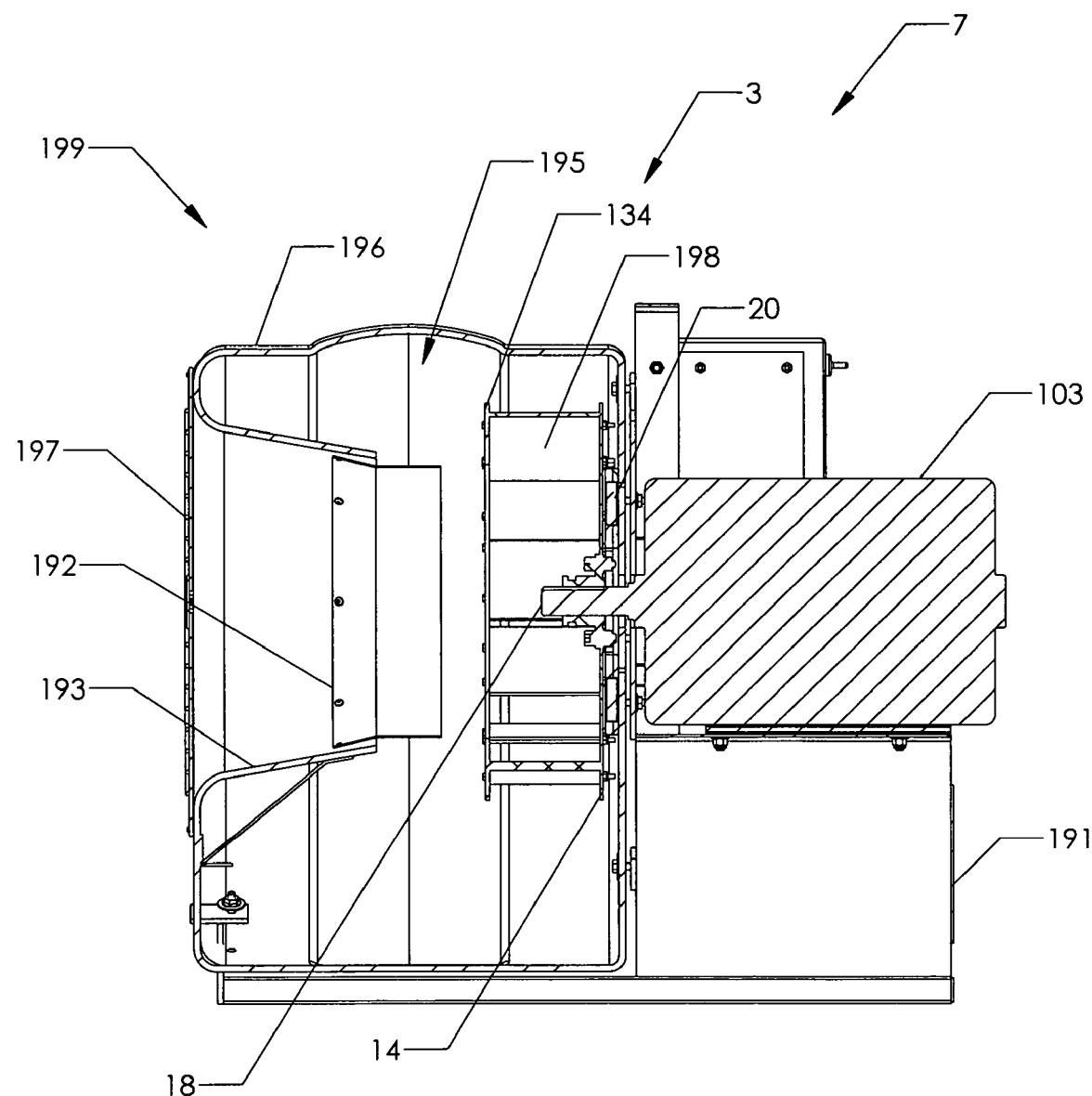
FIG. 14B is a side cross-sectional view of the magnetic heater apparatus of FIG. 14A.

FIGS. 14A and 14B are exploded and cross-sectional views, respectively, of a magnetic heater apparatus 7 in accordance with an embodiment of the present invention. The magnetic heater apparatus 7 comprises a blower 199 and a magnetic heater 3. The blower 199 comprises a motor mount 191, a motor 103, a blower housing 196, blower fan 134, a blower housing sleeve 192, and an air intake screen 197. The magnetic heater 3 comprises a magnet assembly 20 and a conductive member 14 that is an element of the blower fan 134 as described below.

Those in the air-moving arts will recognize that the blower 199 is substantially of the known squirrel-cage blower configuration. The blower housing 196 defines an annular volume 195 in fluid communication with an axial inlet 193 and a tangential outlet 194.

The blower fan 134 comprises a plurality of fan blades 198 coupled to the conductive member 14. The conductive member 14 is in the form of a disk-shaped plate of substantially the same configuration as the embodiment of FIG. 3. The magnet assembly 20 is also of substantially the same configuration as the embodiment of FIG. 3. The magnet assembly 20 comprises an axial shaft annulus 23. The magnet assembly 20 is coaxially located within the annular volume 195. The blower fan 134 is coaxially located within the annular volume 195 such that the conductive member 14 of the blower fan 134 is located co-axially and adjacent magnet assembly 20. The blower housing sleeve 192 is coupled to the blower housing 196 about the axial inlet 193 located co-axially with and adjacent to the blower fan 134 and adapted to guide air flow from the axial inlet 193 to the blower fan 134. The air intake screen 197 is coupled to the blower housing 196 so as to cover the axial inlet 193.

It is anticipated that in other embodiments in accordance with the present invention, the blower housing sleeve 192 is an integral part of the blower housing 196 in consideration of engineering preference.

The motor mount 191 is coupled to the blower housing 196, and the motor 103 is coupled to the motor mount 191 such that a shaft 18 of the motor 103 is located coaxially with the magnet assembly 20 and the blower fan 134 extending into the annular volume 195. The shaft 18 extends into the annular volume 195, passing through the shaft annulus 23 of the magnet assembly 20, and is coupled in operative engagement to the conductive member 14, so as to rotate the conductive member 14, and thus the blower fan 134, when in operation. The magnet assembly 20 is coupled to and fixed the blower housing 196. In operation, the conductive member 14 is rotated relative to the stationary magnet assembly 20, whereby the conductive member 14 is heated due to inductive heating from a time-varying magnetic flux induced by the magnet assembly 20.

It is anticipated that in other embodiments in accordance with the present invention, the motor 103 is mounted to the blower housing 196 in any suitable manner, in consideration of engineering preference.

In operation, air is drawn into the axial inlet 193, directed by the blower housing sleeve 192, by the blower fan 134. The air passes over the conductive member 14 wherein the heat generated by the magnetic heater 3 is transferred to the air. The heated air is subsequently exhausted out of the tangential outlet 194. In other embodiments in accordance with the present invention, the fan blades 198 are adapted to act as heat sinks for the transfer of heat from the conductive member 14 to the air.

Figure 16:
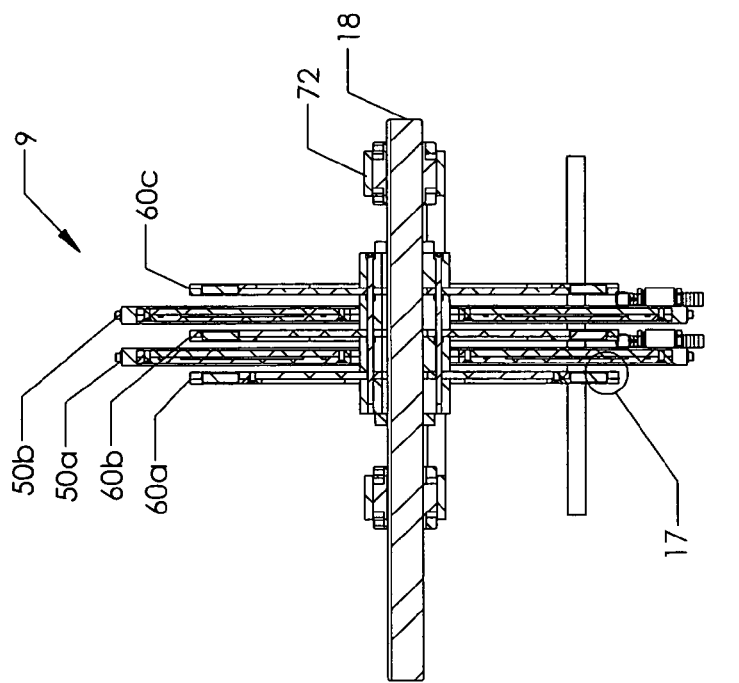
FIG. 16 is a side cross-sectional view of the magnetic heater of FIG. 15 along cut line 16—16.
Figure 15:
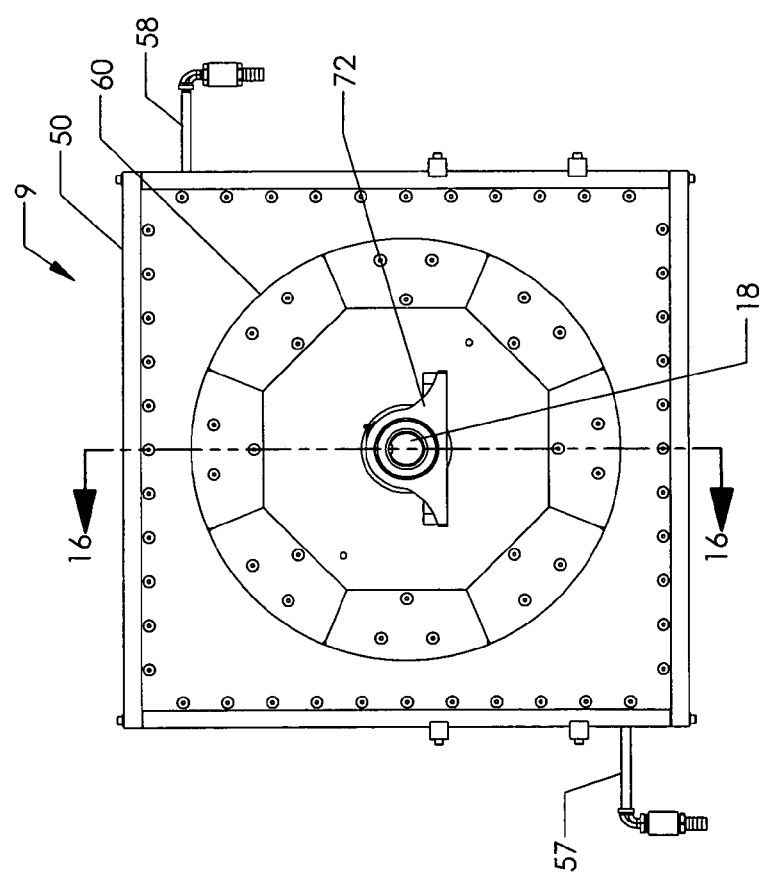
FIG. 15 is a front view of a magnetic heater, in accordance with an embodiment of the present invention.

FIG. 15 is a front view of a magnetic heater 9, in accordance with an embodiment of the present invention. FIG. 16 is a side cross-sectional view of the magnetic heater of FIG. 15 along cut line 16—16. The magnetic heater 9 comprises a plurality of conductor assemblies 50, 50a–b and a plurality of magnet assemblies 60, 60a–c in closely-spaced, opposing, alternating configuration, aligned along an axis about a shaft 18. Each of the plurality of magnet assemblies 60 are coupled to the shaft 18, such that the magnet assemblies 60 rotate relative to the conductor assemblies 50 when the shaft is rotated.

It is appreciated that in other embodiments, the magnetic heater 9 may comprise one or more conductor assemblies 50 and one or more magnet assemblies 60 suitable for a particular purpose. By way of example, but not limited thereto, a magnetic heater may have one conductor assembly 50 and one magnet assembly 60; one conductor assembly 50 and two magnet assemblies 60, one magnet assembly 60 on either side of the conductor assembly 50; one magnet assembly 60 and two conductor assemblies 50, one conductor assembly 50 on either side of the magnet assembly 60; and combinations of the above. One can understand that heat output is related to the number of conductor assemblies 50 and magnet assemblies 60 and that the magnetic heater provides a modular approach for providing heat output.

Figure 17:
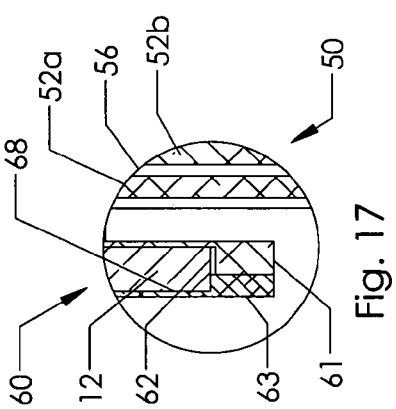
FIG. 17 is a partial cutaway detailed view of the side cross-sectional view of FIG. 16.

FIG. 17 is a partial cutaway detailed view of the side cross-sectional view of FIG. 16. The magnet assembly 60 comprises one or more magnets 12 and is adapted to dispose the one or more magnets 12 in close proximity to the conductor assembly 50.

Figure 18:
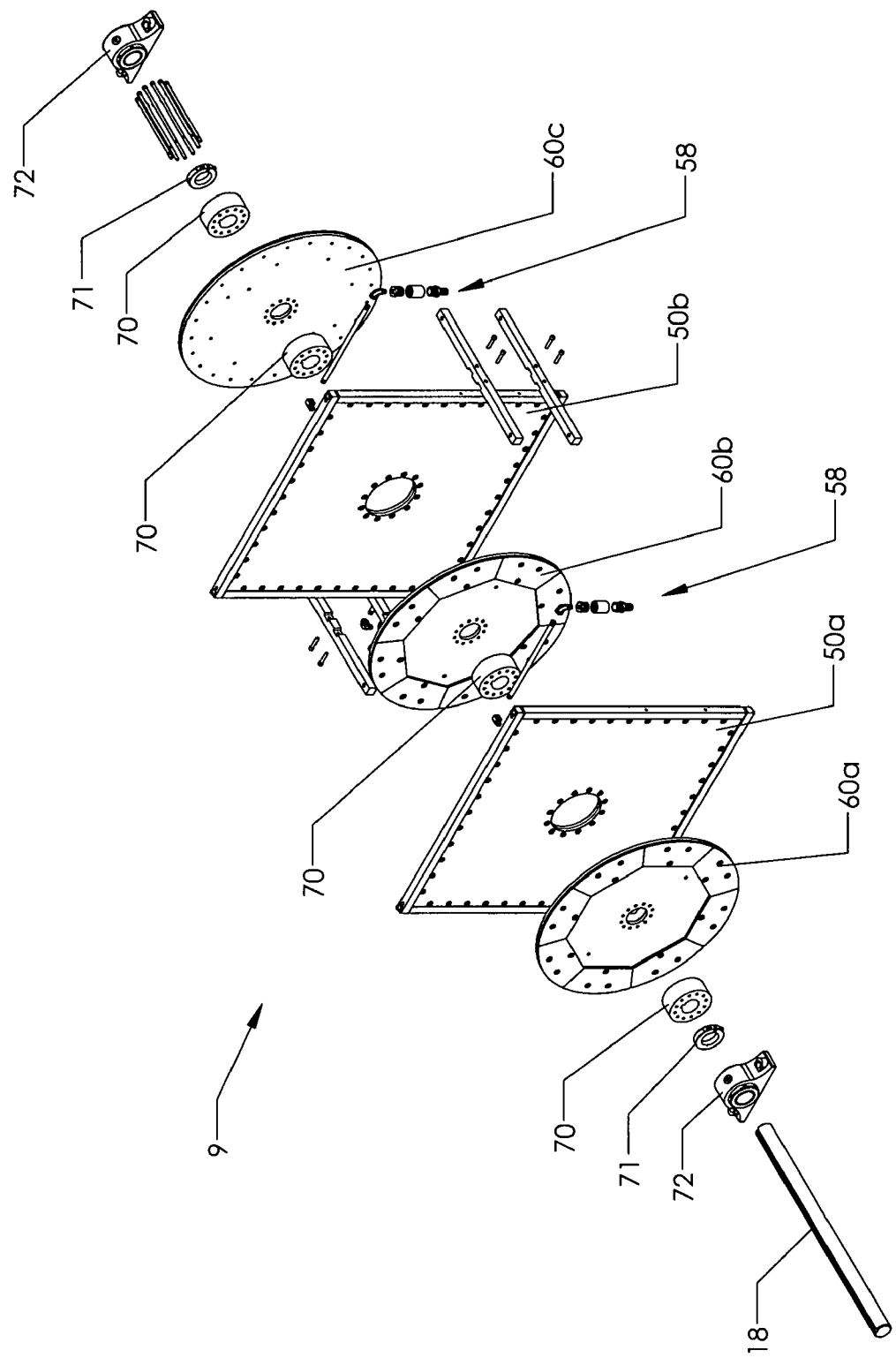
FIG. 18 is a partially exploded view of the magnetic heater of FIG. 15.

FIG. 18 is a partially exploded view of the magnetic heater 9 of FIGS. 15–17. The magnetic heater 9 comprises a first, second and third conductor assembly 50a–b in alternating arrangement with a first, second, third, and fourth magnet assembly 60a–c. The conductor assemblies 50a–b and magnet assemblies 60a–c are disposed upon a shaft 18, which itself is supported by a pair of pillow blocks 72. The conductor assemblies 50a–b and magnet assemblies 60a–c are spaced apart a predetermined distance and held together as an assembly by a plurality of bushings 70, collars 71, and the pillow blocks 72. The magnetic heater 9 is adapted such that the magnet assemblies 60a–c are coupled to the shaft 18 and rotate relative to the conductor assemblies 50a–b when the shaft 18 is rotated.

Figure 19:
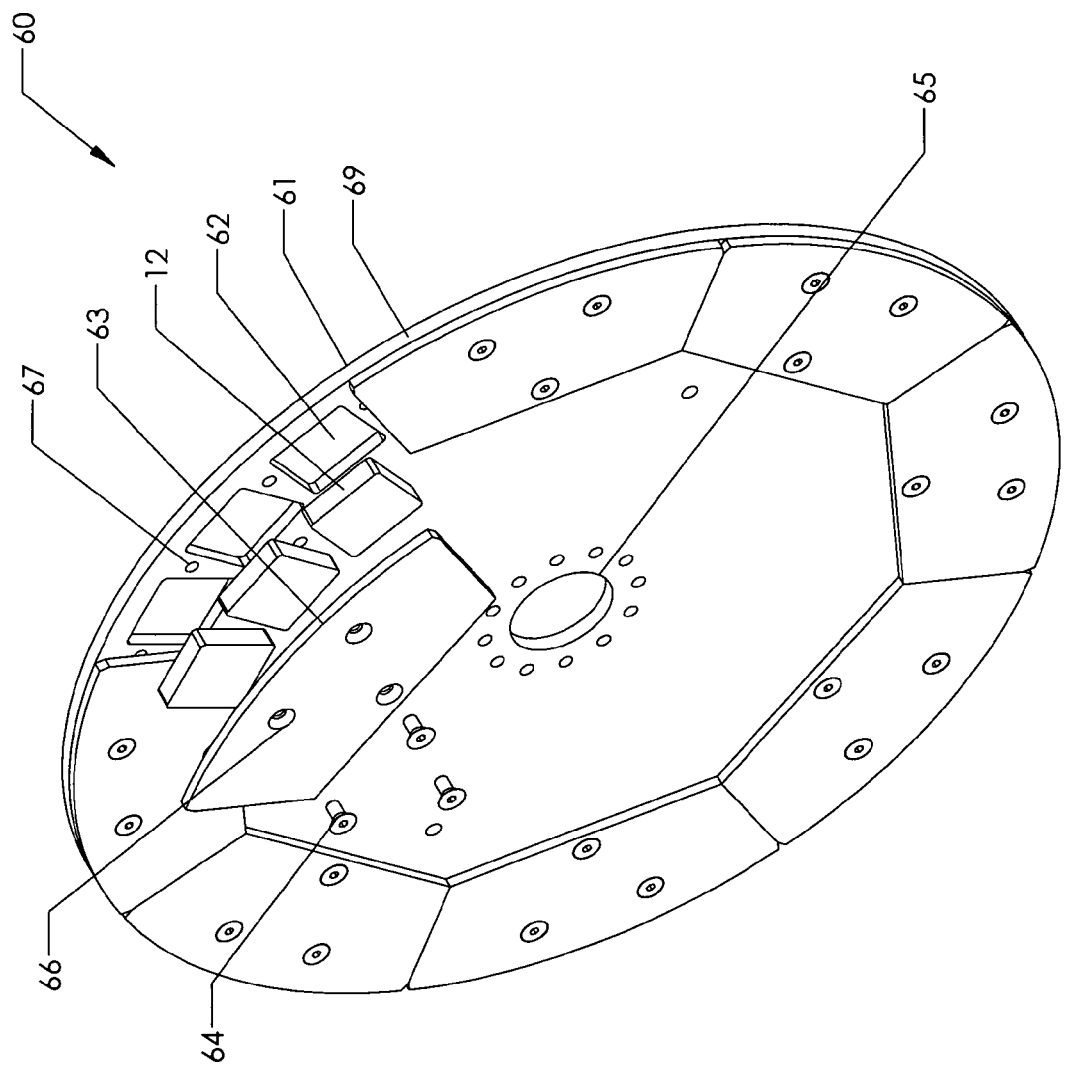
FIG. 19 is an exploded perspective view of a rotatable magnet assembly of the magnetic heater of FIG. 15.

FIG. 19 is an exploded perspective view of a magnet assembly 60 of the magnetic heater 9 of FIG. 15. The magnet assembly 60 comprises a magnet plate 61 in the form of a substantially circular disk. Disposed on a side of the magnet plate 61 and a predetermined distance adjacent the magnet plate peripheral edge 69 are a plurality of magnet pockets 62 adapted to at least partially receive at least one magnet 12 therein. The magnets 12 are retained within the magnet pockets 62 by a plurality of retainer plates 63. The retainer plates 63 comprise a plurality of fastener apertures 66 adapted to receive suitable fasteners 64 there through. The fastener apertures 66 are adapted to align with threaded bores 67 disposed in the magnet plate 61. The retainer plates 63 engage the magnets 12 and the magnet plate 61 to retain the magnets 12 within respective magnet pockets 62.

Referring again to FIG. 17, the retainer plates 63 comprise a plurality of retainer pockets 68 complementary with the magnet pockets 62 and adapted to receive at least one magnet 12 therein. In other embodiments, either the magnet pockets 62 or the retainer pockets 68 are adapted to receive the magnet 12 entirely therein, and either the retainer plate 63 or the magnet plate 61, respectively, comprise a substantially flat surface to contain the magnet 12 there in.

The magnet plate 61 further comprise a central shaft aperture 65 adapted to receive the shaft 18 there through.

It is appreciated that in other embodiments, the magnet assembly 60 may comprise one or more magnets 12 suitable for a particular purpose. The magnet 12 provides a time-varying magnetic flux on the conductor assembly 50 when there is relative movement of the magnet 12 with respect to the conductor assembly 50. Such magnetic flux may be provided by one or more magnets 12. Further, the size and shape of the magnet 12 can be chosen to provide a predetermined magnetic flux density suitable for a particular purpose. In yet other embodiments in accordance with the present invention, there is provided multiple rows of magnets 12 spaced apart in the radial direction from the shaft aperture 65.

Further, it is appreciated that in other embodiments in accordance with the present invention, the magnet assembly 60 may take other forms suitable for a particular purpose for providing the magnets 12 in close proximity to the conductor assembly 50. The magnets 12 can be coupled to the magnet plate by other fastening means, including, but not limited to, fasteners, adhesives, and coatings, with or without the retainer plate 61. In embodiments wherein the magnet assembly 60 is rotated, the means of retention of the magnets 12 to the magnet plate 61 must withstand the forces tending to decouple and throw the magnets 12 from the magnet plate 61.

Figure 20:
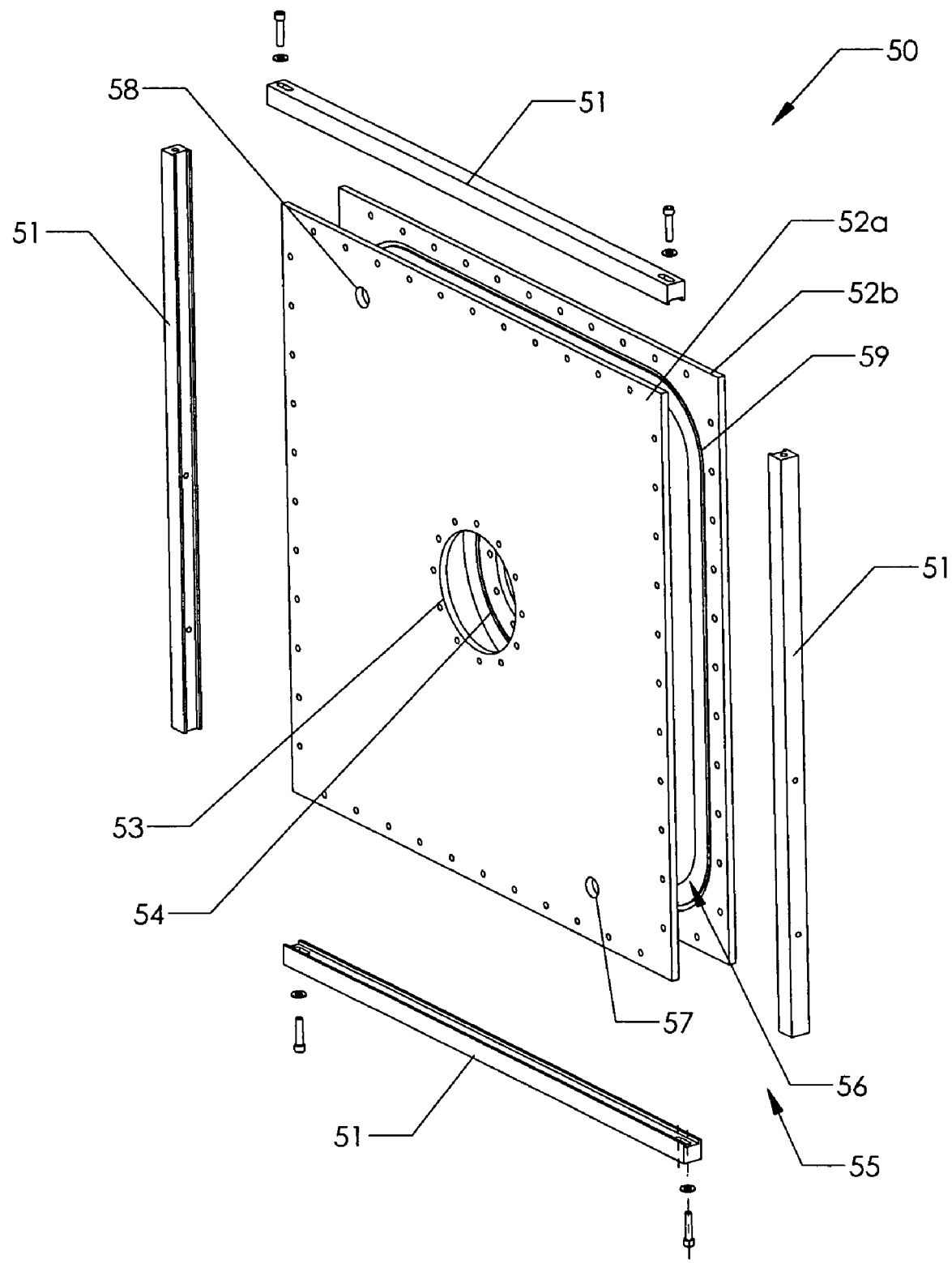
FIG. 20 is an exploded perspective view of a conductor assembly of the magnetic heater of FIG. 15.

FIG. 20 is an exploded perspective view of a conductor assembly 50 of the magnetic heater 9 of FIG. 15. The conductor assembly 50 comprises a pair of conductor plates 52a, 52b retained about a peripheral edge 55 in fluid-tight engagement by a frame 51. At least one of the pair of conductor plates 52*a*, 52*b* comprises an electrically conductive material suitable for the particular purpose, adapted to enable induced eddy-currents within the conductor plate 52*a*, 52*b* when exposed to a time-varying magnetic flux which causes the conductor plate 52*a*, 52*b* to heat up.

The frame 51 is adapted to retain the conductor plates 52*a*, 52*b* in a facing relationship a predetermined distance apart defining a fluid space 56 there between. A gasket 59 seals the peripheral edge 55 of the conductive plates 52*a*, 52*b* such that fluid is retained within the fluid space 56. It is appreciated that suitable means for fluid-tight sealing is provided, such as, but not limited to, welding, brazing, soldering, the frame 51, coatings, and resilient sealing elements, such as, but not limited to, an "O-ring" and gasket.

The conductor plates 52*a*, 52*b* each have a bushing aperture 53 adapted to receive the bushing 70 therein. A bushing aperture seal 54 about the bushing aperture 53 and adapted to engage the conductor plates 52*a*, 52*b* about the bushing aperture 53 is adapted to maintain fluid-tight engagement there between to retain fluid within the fluid space 56.

Referring again to FIGS. 15 and 18, the conductor assembly 50 further comprises a fluid inlet 57 and a fluid outlet 58, in communication with the fluid space 56. Referring to FIG. 20, the fluid inlet 57 and outlet 58 are an element of one or both of the conductor plates 52*a*, 52*b*. The conductor assembly 50 is adapted such that fluid may be passed between the fluid inlet 57, the fluid space 56, and the fluid outlet 58 sufficient to provide efficient heat transfer from the conductor plates 52*a*, 52*b* to the fluid as the conductor plates 52*a*, 52*b* are heated during operation.

Figure 21:
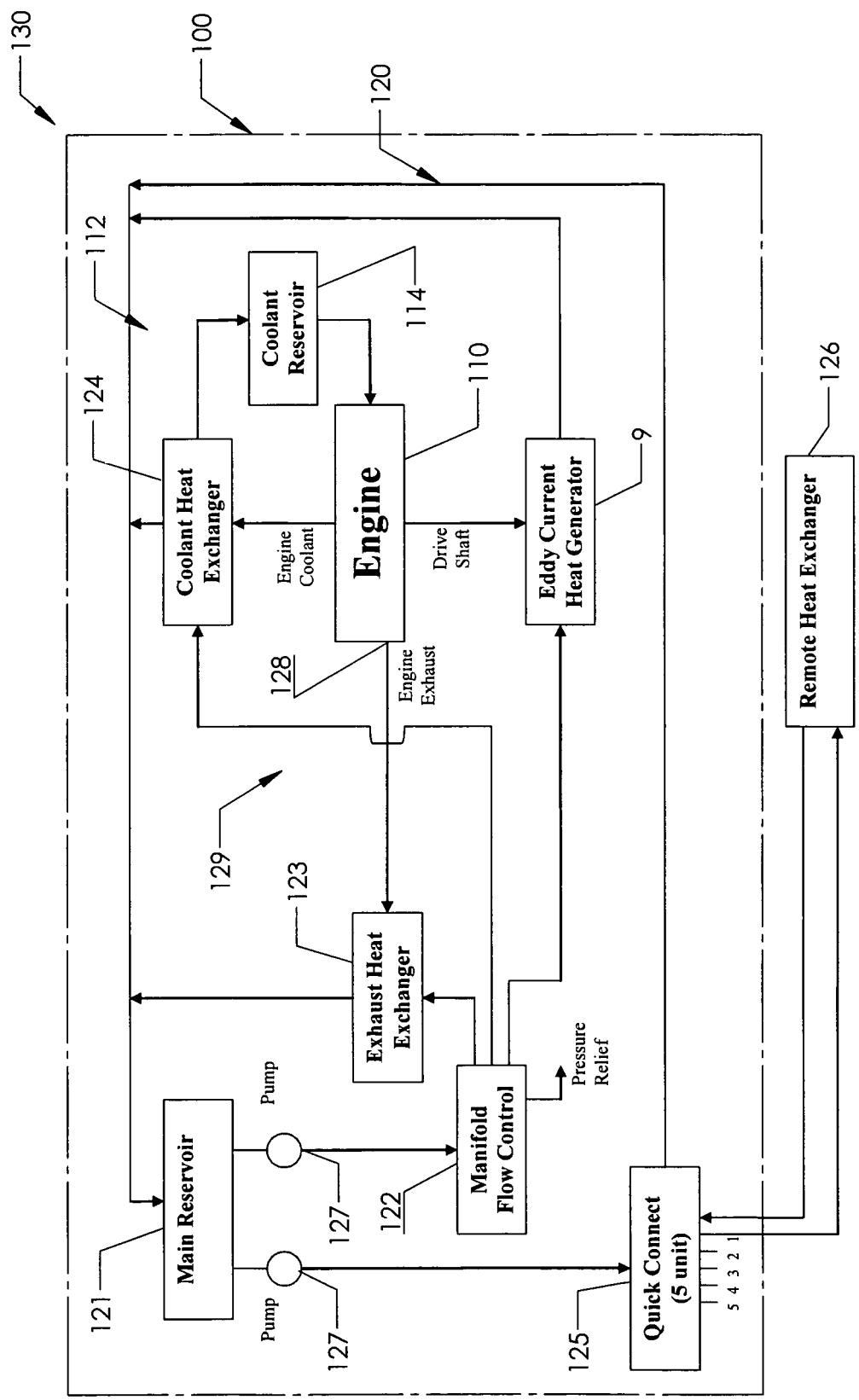
FIG. 21 is a schematic diagram of an engine-driven heat generation system, in accordance with an embodiment of the present invention.

FIG. 21 is a schematic diagram of an engine-driven heat generation system 100, in accordance with an embodiment of the present invention. The engine-driven heat generation system 100 provides heat to external applications via a working fluid supplied to a suitable external heat exchanger 126 as described below. The engine-driven heat generation system 100 comprises an internal combustion engine 110, a magnetic heater 9, such as, but not limited to, the embodiment of FIG. 18, and a fluid handling system 130. A drive coupling of the engine 110 drives or rotates the magnet assemblies 60 within the magnetic heater 9 which in turn heats the conductor plates 52*a*, 52*b* and the working fluid flowing within the conductor assemblies 50.

The fluid handling system 130 comprises a working fluid handling system 120, an engine cooling system 112, and an exhaust system 129. The working fluid handling system 120 comprises a fluid reservoir 121, a manifold flow control 122, an exhaust heat exchanger 123, a coolant heat exchanger 124, and one or more circulating pumps 127, all in fluid communication adapted to circulate the working fluid therein. The manifold flow control 122 is adapted to direct the working fluid to the magnetic heater 9, the exhaust heat exchanger 123, and the coolant heat exchanger 124.

The heat generated by the magnetic heater 9 is transferred to the working fluid passing within the magnetic heater 9. The working fluid is collected in the fluid reservoir 121 and either directed again through the manifold flow control 122 or directed to an external heat exchanger 126 by way of an external manifold 125, or a combination thereof. The external manifold 125 is adapted to provide one or more fluid take-offs to supply the heated working fluid and return cooled working fluid to/from one or more external heat exchangers 126.

The engine cooling system 112 comprises a coolant reservoir 114 for a coolant fluid in fluid communication with the engine 110 and the coolant heat exchanger 124. The coolant fluid circulates within the engine 110, wherein the heat from the structure of the engine 110 is transferred to the coolant fluid and subsequently transferred to the working fluid in the coolant heat exchanger 124. In this way, the heat from the engine 110 as well as the heat from the magnetic heater 9 is used to heat the working fluid.

The engine 110 produces hot exhaust gas as a product of combustion which is directed external to the engine 110 by an exhaust manifold 128. The exhaust system 129 comprises the exhaust heat exchanger 123 which is in fluid communication with the exhaust manifold 128 and is adapted to transfer the heat from the exhaust of the engine 110 to the working fluid. In this way, the heat from the exhaust as well as the heat from the magnetic heater 9 is used to heat the working fluid.

The engine-driven heat generation system 100, therefore, utilizes the heat of the structure and the heat from the exhaust of the engine 110 to augment the heat from the magnetic heater 9 to efficiently provide a heated working fluid for use in external applications.

Figure 22:
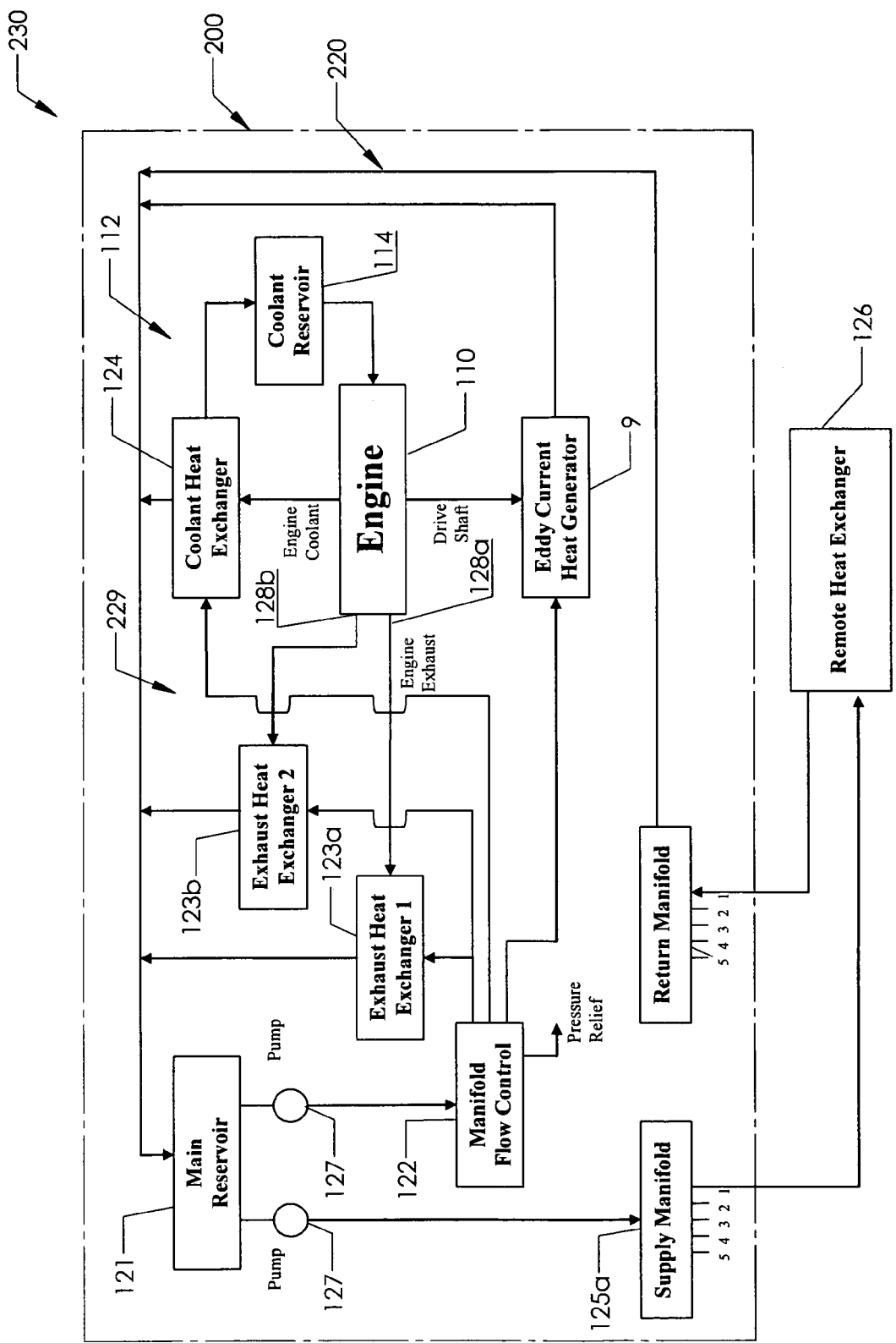
FIG. 22 is a schematic diagram of an engine-driven heat generation system, in accordance with an embodiment of the present invention.

It is appreciated that a variety of configurations of an engine-driven heat generation system may be utilized, depending on engineering design preferences and constraints. FIG. 22 is a schematic diagram of another engine-driven heat generation system 200, in accordance with another embodiment of the present invention. The engine-driven heat generation system 200 comprises an internal combustion engine 110, a magnetic heater 9, such as, but not limited to, the embodiment of FIG. 18, and a fluid handling system 230. The configuration and function is substantially similar to the embodiment of FIG. 21, but this embodiment comprises an engine 110 having two exhaust manifolds 128*a*, 128*b*, two exhaust heat exchangers 123*a*, 123*b* in fluid communication with respective exhaust manifolds 128*a*, 128*b*, and separate external manifolds, a supply manifold 125*a* and a return manifold 125*b*.

The applications for utilizing the heat generated by the engine-driven heat generation system 100, 200 are vast. The working fluid is heated to a predetermined temperature suitable for a particular purpose. It is anticipated that most any application that utilizes the transfer of heat via a heat exchanger supplied by a heated working fluid would be suitable for use with the engine-driven heat generation system 100, 200.

In an embodiment in accordance with the present invention, the heated working fluid is passed through a heat exchanger that is part of a forced-air ventilation system to provide heated air to a building. In another embodiment, the working fluid is passed through hoses that are laid out on the ground and covered with a covering so as to heat the ground, such as to thaw out frozen ground for excavation. In yet another application, the working fluid is passed through a heat exchanger of a hot water supply system that is submerged in a tank of water so as to heat the water for use. These are but a few of the vast number of applications suitable for use with the engine-driven heat generation system 100, 200.

The engine-driven heat generation system 100, 200 realizes significantly improved efficiencies over conventional magnetic heaters by the utilization of the heat captured from the engine exhaust and the heat captured from the engine cooling system that are added to the heat generated by the magnetic heater.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and appended claims contained.

I claim:

1. A magnetic heater, comprising:
a drive shaft;
one or more conductor assemblies, each conductor assembly comprising a pair of substantially parallel conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux; and
one or more magnet assemblies each comprising a plurality of magnets, each magnet assembly in opposing, facing arrangement spaced apart a predetermined distance from a respective conductor assembly, aligned along an axis about the drive shaft, wherein the magnet assembly is adapted to dispose the magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during operation, wherein adjacent magnets have opposite polarity.

2. A magnetic heater, comprising:
a drive shaft;
a first and second conductor assembly, each conductor assembly comprising a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux;
one or more magnet assemblies comprising one or more magnets, each magnet assembly in opposing, facing arrangement spaced apart a predetermined distance from a resrective conductor assembly, aligned along an axis about the drive shaft, wherein the magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during oreration,
the first and second conductor assemblies coaxially disposed in alternating arrangement with a first, second, and third magnet assembly.

3. A magnetic heater, comprising:
a drive shaft;
one or more conductor assemblies, each conductor assembly comprising a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux; and
one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during operation, the one or more magnet assemblies comprising:
a magnet plate in the form of a substantially circular disk, a plurality of magnet pockets disposed on a side of the magnet plate and at a predetermined distance adjacent a magnet plate peripheral edge, the plurality of magnet pockets adapted to at least partially receive at least one magnet therein;
at least one magnet at least partially disposed within each magnet pocket; and
at least one retainer plate coupled to the magnet plate coupling the magnet within the magnet pocket.

4. The magnetic heater of claim 3, wherein the retainer plates comprise a plurality of fastener apertures adapted to receive suitable fasteners there through, the fastener apertures adapted to align with threaded bores disposed in the magnet plate.

5. The magnetic heater of claim 3, wherein the retainer plate comprises a plurality of retainer pockets complementary with the magnet pockets and adapted to receive at least a portion of at least one magnet therein.

6. The magnetic heater of claim 3, the magnet pockets are adapted to receive the magnet entirely therein, and the retainer plate comprises a substantially flat surface to contain the magnet there in.

7. The magnetic heater of claim 3, the magnet assembly comprising:
a magnet plate in the form of a substantially circular disk; and
at least one retainer plate coupled to the magnet plate, the at least one retainer plate including one or more magnet pockets disposed on a side of the retainer plate, the retainer pocket adapted to receive the magnet therein, at least one magnet disposed within each magnet pocket.

8. A magnetic heater, comprising:

a drive shaft;

one or more conductor assemblies, each conductor assembly comprising a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux; and one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during operation, wherein the magnet plates further comprise a central shaft aperture adapted to accept the drive shaft there through.

9. A magnetic heater, comprising:

a drive shaft;

one or more conductor assemblies, each conductor assembly comprising a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux; and one or more magnet assemblies comprising one or more magnets, each magnet assembly in opposing, facing arrangement spaced apart a predetermined distance from a resrective conductor assembly, aligned along an axis about the drive shaft, wherein the magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during operation, the pair of conductor plates retained about a peripheral edge in fluid-tight engagement, the conductor plates each have a bushing aperture adapted to receive the bushing therein, a bushing seal about the bushing aperture adapted to engage the conductor plates in fluid-tight engagement there between to retain fluid within the fluid space.

10. A magnetic heater, comprising:

a drive shaft;

one or more conductor assemblies, each conductor assembly comprising a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux; and one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during operation, the pair of conductor plates retained about a peripheral edge in fluid-tight engagement by a frame, the frame adapted to retain the conductor plates in facing spaced-apart relationship a predetermined distance apart defining a fluid space there between, the frame adapted to seal the peripheral edge of the conductive plates such that fluid is retained within the fluid space, the conductor plates each have a bushing aperture adapted to receive the bushing therein, a bushing seal about the bushing aperture adapted to engage the conductor plates about the bushing aperture and the bushing is adapted to maintain fluid-tight engagement there between to retain fluid within the fluid space.

11. A magnetic heater, comprising:

a drive shaft;

one or more conductor assemblies, each conductor assembly comprising a pair of conductor plates defining a fluid space there between, the fluid space in fluid communication with a fluid inlet and a fluid outlet adapted to allow the flow of fluid through the fluid space, at least one of the conductor plates comprise an electrically conductive material adapted to enable induced eddy-currents within the at least one conductor plate when exposed to a time-varying magnetic flux; and one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to the conductor assembly, each magnet assembly coupled to the drive shaft adapted such that the magnet assembly rotates relative to the conductor assembly when the drive shaft is caused to rotate, wherein the magnet assembly is adapted to induce eddy currents in the conductor assembly when moved relative thereto, wherein the fluid space is adapted to provide heat transfer from the conductor plates to the fluid as the conductor plates are heated during operation, wherein the fluid is a liquid.

12. A magnetic heater, comprising:
a drive shaft;
one or more conductor assemblies, each conductor assembly comprising a pair of conductor plates defining a fluid space there between, the fluid space in fluid communication with a fluid inlet and a fluid outlet adapted to restrict the flow of a liquid from the fluid inlet, through the fluid space, and out of the fluid outlet, the conductor plates comrprise an electrically conductive material adapted to enable induced eddy-currents within the conductor plates when exposed to a time-varying magnetic flux; and
one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to at least one conductor plate, each magnet assembly coupled to the drive shaft adapted such that the magnet assembly rotates relative to the at least one conductor plate when the drive shaft is caused to rotate, wherein the magnet assembly is adapted to induce eddy currents in the at least one conductor plate when moved relative thereto, wherein the fluid space is adapted to provide heat transfer from the conductor plates to the liquid as the conductor plates are heated during operation, wherein adjacent magnets have opposite polarity.

13. A magnetic heater, comprising:
a drive shaft;
a first and second conductor assembly, each conductor assembly comprising a pair of conductor plates defining a fluid space there between, the fluid space in fluid communication with a fluid inlet and a fluid outlet adapted to restrict the flow of a liquid from the fluid inlet, through the fluid space, and out of the fluid outlet, the conductor plates comprise an electrically conductive material adapted to enable induced eddy-currents within the conductor plates when exposed to a time-varying magnetic flux; and
one or more magnet assemblies comprising one or more magnets, each magnet assembly in opposing, facing arrangement spaced apart a predetermined distance from a resrective conductor assembly, aligned along an axis about the drive shaft, wherein the magnet assembly is adapted to dispose the one or more magnets in close proximity to at least one conductor plate, each magnet assembly coupled to the drive shaft adapted such that the magnet assembly rotates relative to the at least one conductor plate when the drive shaft is caused to rotate, wherein the magnet assembly is adapted to induce eddy currents in the at least one conductor plate when moved relative thereto, wherein the fluid space is adapted to provide heat transfer from the conductor plates to the liquid as the conductor plates are heated during oreration, the first and second conductor assemblies coaxially disposed in alternating arrangement with a first, second, and third magnet assembly.

14. A magnetic heater, comprising:
a drive shaft;
one or more conductor assemblies, each conductor assembly comprising a pair of conductor plates defining a fluid space there between, the fluid space in fluid communication with a fluid inlet and a fluid outlet adapted to restrict the flow of a liquid from the fluid inlet, through the fluid space, and out of the fluid outlet, the conductor plates comprise an electrically conductive material adapted to enable induced eddy-currents within the conductor plates when exposed to a time-varying magnetic flux; and
one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to at least one conductor plate, each magnet assembly coupled to the drive shaft adapted such that the magnet assembly rotates relative to the at least one conductor plate when the drive shaft is caused to rotate, wherein the magnet assembly is adapted to induce eddy currents in the at least one conductor plate when moved relative thereto, wherein the fluid space is adapted to provide heat transfer from the conductor plates to the liquid as the conductor plates are heated during operation, the magnet assembly comprising:
a magnet plate in the form of a substantially circular disk, a plurality of magnet pockets disposed on a side of the magnet plate and at a predetermined distance adjacent a magnet plate peripheral edge, the plurality of magnet pockets adapted to at least partially receive at least one magnet therein;
at least one magnet at least partially disposed within each magnet pocket; and
at least one retainer plate coupled to the magnet plate coupling the magnet within the magnet pocket.

15. The magnetic heater of claim 14, wherein the retainer plates comprise a plurality of fastener apertures adapted to receive suitable fasteners there through, the fastener apertures adapted to align with threaded bores disposed in the magnet plate.

16. The magnetic heater of claim 14, wherein the retainer plate comprises a plurality of retainer pockets complementary with the magnet pockets and adapted to receive at least a portion of at least one magnet therein.

17. The magnetic heater of claim 14, the magnet pockets are adapted to receive the magnet entirely therein, and the retainer plate comprises a substantially flat surface to contain the magnet there in.

18. The magnetic heater of claim 14, the magnet assembly comprising:
a magnet plate in the form of a substantially circular disk; and
at least one retainer plate coupled to the magnet plate, the at least one retainer plate including one or more magnet pockets disposed on a side of the retainer plate, the retainer pocket adapted to receive the magnet therein, at least one magnet disposed within each magnet pocket.

19. A magnetic heater, comprising:
a drive shaft;
one or more conductor assemblies, each conductor assembly comprising a pair of conductor plates defining a fluid space there between, the fluid space in fluid communication with a fluid inlet and a fluid outlet adapted to restrict the flow of a liquid from the fluid inlet, through the fluid space, and out of the fluid outlet, the conductor plates comprise an electrically conductive material adapted to enable induced eddy-currents within the conductor plates when exposed to a time-varying magnetic flux; and one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to at least one conductor plate, each magnet assembly coupled to the drive shaft adapted such that the magnet assembly rotates relative to the at least one conductor plate when the drive shaft is caused to rotate, wherein the magnet assembly is adapted to induce eddy currents in the at least one conductor plate when moved relative thereto, wherein the fluid space is adapted to provide heat transfer from the conductor plates to the liquid as the conductor plates are heated during oreration, wherein the magnet plates further comprise a central shaft aperture adapted to accept the drive shaft there through.

20. A magnetic heater, comprising:

a drive shaft;

one or more conductor assemblies, each conductor assembly comprising a pair of conductor plates defining a fluid space there between, the fluid space in fluid communication with a fluid inlet and a fluid outlet adapted to restrict the flow of a liquid from the fluid inlet, through the fluid space, and out of the fluid outlet, the conductor plates comprise an electrically conductive material adapted to enable induced eddy-currents within the conductor plates when exposed to a time-varying magnetic flux; and one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to at least one conductor plate, each magnet assembly coupled to the drive shaft adapted such that the magnet assembly rotates relative to the at least one conductor plate when the drive shaft is caused to rotate, wherein the magnet assembly is adapted to induce eddy currents in the at least one conductor plate when moved relative thereto, wherein the fluid space is adapted to provide heat transfer from the conductor plates to the liquid as the conductor plates are heated during operation, the pair of conductor plates retained about a peripheral edge in fluid-tight engagement, the conductor plates each have a bushing aperture adapted to receive the bushing therein, a bushing seal about the bushing aperture adapted to engage the conductor plates in fluid-tight engagement there between to retain fluid within the fluid space, the bushing adapted to support the drive shaft there through.

21. A magnetic heater, comprising:

a drive shaft;

one or more conductor assemblies, each conductor assembly comprising a pair of conductor plates defining a fluid space there between, the fluid space in fluid communication with a fluid inlet and a fluid outlet adapted to restrict the flow of a liquid from the fluid inlet, through the fluid space, and out of the fluid outlet, the conductor plates comprise an electrically conductive material adapted to enable induced eddy-currents within the conductor plates when exposed to a time-varying magnetic flux; and one or more magnet assemblies comprising one or more magnets, each magnet assembly in opposing, facing arrangement spaced apart a predetermined distance from a respective conductor assembly, aligned along an axis about the drive shaft, wherein the magnet assembly is adapted to dispose the one or more magnets in close proximity to at least one conductor plate, each magnet assembly coupled to the drive shaft adapted such that the magnet assembly rotates relative to the at least one conductor plate when the drive shaft is caused to rotate, wherein the magnet assembly is adapted to induce eddy currents in the at least one conductor plate when moved relative thereto, wherein the fluid space is adapted to provide heat transfer from the conductor plates to the liquid as the conductor plates are heated during operation, the pair of conductor plates retained about a peripheral edge in fluid-tight engagement by a frame, the frame adapted to retain the conductor plates in facing spaced-apart relationship a predetermined distance apart defining a fluid space there between, the frame adapted to seal the peripheral edge of the conductive plates such that fluid is retained within the fluid space, the conductor plates each have a bushing aperture adapted to receive the bushing therein, a bushing seal about the bushing aperture adapted to engage the conductor plates about the bushing aperture and the bushing is adapted to maintain fluid-tight engagement there between to retain fluid within the fluid space, the bushing adapted to support the drive shaft there through.

\* \* \* \* \*